(12) United States Patent
Takeda et al.

(10) Patent No.: US 7,420,606 B2
(45) Date of Patent: Sep. 2, 2008

(54) TIMING GENERATOR, SOLID-STATE IMAGING DEVICE AND CAMERA SYSTEM

(75) Inventors: Katsumi Takeda, Kyoto (JP); Junji Tokumoto, Takatsuki (JP); Yoshiaki Sone, Settsu (JP); Tsuyoshi Hasuka, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 795 days.

(21) Appl. No.: 10/891,868

(22) Filed: Jul. 14, 2004

(65) Prior Publication Data

US 2005/0012822 A1 Jan. 20, 2005

(30) Foreign Application Priority Data

Jul. 16, 2003 (JP) ............................. 2003-275551

(51) Int. Cl.
*H04N 3/14* (2006.01)
*H04N 5/335* (2006.01)
(52) U.S. Cl. .................... 348/312; 348/296; 348/222.1; 348/294
(58) Field of Classification Search ................ 348/312, 348/396, 296, 222.1, 294
See application file for complete search history.

(56) References Cited

U.S. PATENT DOCUMENTS

| 5,293,080 | A | * | 3/1994 | Hiwada et al. | ............... | 327/141 |
| 6,285,399 | B1 | * | 9/2001 | Tao | .............................. | 348/312 |
| 6,680,750 | B1 | * | 1/2004 | Tournier et al. | ............. | 348/294 |
| 2001/0017659 | A1 | | 8/2001 | Suzuki | | |
| 2002/0135690 | A1 | * | 9/2002 | Tashiro et al. | ................ | 348/312 |
| 2003/0128286 | A1 | * | 7/2003 | Kubota et al. | ............... | 348/296 |
| 2005/0146625 | A1 | * | 7/2005 | Kubo et al. | .............. | 348/222.1 |

FOREIGN PATENT DOCUMENTS

| EP | 81109081 | * 10/1981 |
| JP | 63-61560 | 3/1988 |
| JP | 7-274074 | 10/1995 |
| JP | 9-205591 | 8/1997 |
| JP | 10-257398 | 9/1998 |
| JP | 2001-238138 | 8/2001 |
| JP | 2001-245218 | 9/2001 |
| JP | 2003-169261 | 6/2003 |

* cited by examiner

*Primary Examiner*—Ngoc-Yen T. Vu
*Assistant Examiner*—Selam T Gebriel
(74) *Attorney, Agent, or Firm*—Hamre, Schumann, Mueller & Larson, P.C.

(57) ABSTRACT

A timing generator, includes: a first memory circuit that stores timing generation information; a first register for holding the timing generation information in the first memory circuit; a first external input part for accessing to the first register so as to rewrite data therein; a selector that selects one of the first memory circuit and the first external input part in order to conduct writing of data in the first register; and a pulse generation part that generates a pulse timing in accordance with the timing generation information held in the first register so as to output a single or a plurality of pulses. A pulse timing required for driving a solid-state imaging device and the like can be generated easily and the timing generation can be rewritten externally.

9 Claims, 26 Drawing Sheets

FIG. 9A  Timing generation information of the 1st ROM 33
Logical changing unit in V1 to V4 pulses

| Driving mode | Data value (decimal number) |
|---|---|
| 1 | 12 |
| 2 | 10 |

FIG. 9B  Timing generation information of the 2nd ROM 36
Step number corresponding to one-stage vertical transfer
(1step = logical changing unit)

| Driving mode | Data value (decimal number) |
|---|---|
| 1 | 8 |
| 2 | 8 |

FIG. 9C  Timing generation information of the 3rd ROM 39
Stage number of vertical transfer

| Driving mode | Data value (decimal number) |
|---|---|
| 1 | 1 |
| 2 | 2 |

FIG. 9D  Timing generation information of the time-series data ROM 32
Vertical transfer waveform pattern

| | Address | Output1 (V1) | Output2 (V2) | Output3 (V3) | Ouput4 (V4) |
|---|---|---|---|---|---|
| Driving mode 1 | 1 | 0 | 0 | 1 | 1 |
| | 2 | 0 | 0 | 0 | 1 |
| | 3 | 1 | 0 | 0 | 1 |
| | 4 | 1 | 0 | 0 | 0 |
| | 5 | 1 | 1 | 0 | 0 |
| | 6 | 0 | 1 | 0 | 0 |
| | 7 | 0 | 1 | 1 | 0 |
| | 8 | 0 | 0 | 1 | 0 |
| | Address | Output1 (V1) | Output2 (V2) | Output3 (V3) | Ouput4 (V4) |
| Driving mode 2 | 1 | 0 | 0 | 1 | 1 |
| | 2 | 0 | 0 | 0 | 1 |
| | 3 | 1 | 0 | 0 | 1 |
| | 4 | 1 | 0 | 0 | 0 |
| | 5 | 1 | 1 | 0 | 0 |
| | 6 | 0 | 1 | 0 | 0 |
| | 7 | 0 | 1 | 1 | 0 |
| | 8 | 0 | 0 | 1 | 0 |

First memory circuit

| | | | | | | |
|---|---|---|---|---|---|---|
| Driving mode 1 | Logical changing unit in V1 to V4 pulses | 12 (Decimal number) | | | | |
| | Step number corresponding to one-stage vertical transfer (1step = logical changing unit) | 8 (Decimal number) | | | | |
| | Stage number of vertical transfer | 1 (Decimal number) | | | | |
| | Vertical transfer waveform pattern | Address | Output1 (V1) | Output2 (V2) | Output3 (V3) | Output4 (V4) |
| | | 1 | 0 | 0 | 1 | 1 |
| | | 2 | 0 | 0 | 0 | 1 |
| | | 3 | 1 | 0 | 0 | 1 |
| | | 4 | 1 | 0 | 0 | 0 |
| | | 5 | 1 | 1 | 0 | 0 |
| | | 6 | 0 | 1 | 0 | 0 |
| | | 7 | 0 | 1 | 1 | 0 |
| | | 8 | 0 | 0 | 1 | 0 |
| Driving mode 2 | Logical changing unit in V1 to V4 pulses | 10 (Decimal number) | | | | |
| | Step number corresponding to one-stage vertical transfer (1step = logical changing unit) | 8 (Decimal number) | | | | |
| | Stage number of vertical transfer | 2 (Decimal number) | | | | |
| | Vertical transfer waveform pattern | Address | Output1 (V1) | Output2 (V2) | Output3 (V3) | Output4 (V4) |
| | | 1 | 0 | 0 | 1 | 1 |
| | | 2 | 0 | 0 | 0 | 1 |
| | | 3 | 1 | 0 | 0 | 1 |
| | | 4 | 1 | 0 | 0 | 0 |
| | | 5 | 1 | 1 | 0 | 0 |
| | | 6 | 0 | 1 | 0 | 0 |
| | | 7 | 0 | 1 | 1 | 0 |
| | | 8 | 0 | 0 | 1 | 0 |

FIG. 11

First register

| | | | | | | |
|---|---|---|---|---|---|---|
| Driving mode 1 | Logical changing unit in V1 to V4 pulses | 5 (Decimal number) | | | | |
| | Step number corresponding to one-stage vertical transfer (1step = logical changing unit) | 8 (Decimal number) | | | | |
| | Stage number of vertical transfer | 1 (Decimal number) | | | | |
| | Vertical transfer waveform pattern | Address | Output1 (V1) | Output2 (V2) | Output3 (V3) | Output4 (V4) |
| | | 1 | 0 | 0 | 1 | 1 |
| | | 2 | 0 | 0 | 0 | 1 |
| | | 3 | 1 | 0 | 0 | 1 |
| | | 4 | 1 | 0 | 0 | 0 |
| | | 5 | 1 | 1 | 0 | 0 |
| | | 6 | 0 | 1 | 0 | 0 |
| | | 7 | 0 | 1 | 1 | 0 |
| | | 8 | 0 | 0 | 1 | 0 |
| Driving mode 2 | Logical changing unit in V1 to V4 pulses | 10 (Decimal number) | | | | |
| | Step number corresponding to one-stage vertical transfer (1step = logical changing unit) | 8 (Decimal number) | | | | |
| | Stage number of vertical transfer | 2 (Decimal number) | | | | |
| | Vertical transfer waveform pattern | Address | Output1 (V1) | Output2 (V2) | Output3 (V3) | Output4 (V4) |
| | | 1 | 0 | 0 | 1 | 1 |
| | | 2 | 0 | 0 | 0 | 1 |
| | | 3 | 1 | 0 | 0 | 1 |
| | | 4 | 1 | 0 | 0 | 0 |
| | | 5 | 1 | 1 | 0 | 0 |
| | | 6 | 0 | 1 | 0 | 0 |
| | | 7 | 0 | 1 | 1 | 0 |
| | | 8 | 0 | 0 | 1 | 0 |

FIG. 12

First memory circuit

| | | | |
|---|---|---|---|
| Data region (1~2) (1) | Driving mode 1 | Logical changing unit in V1 to V4 pulses | 12 (Decimal number) |
| | Driving mode 2 | Logical changing unit in V1 to V4 pulses | 10 (Decimal number) |
| Data region (1~2) (2) | Driving mode 1 | Step number corresponding to one-stage vertical transfer (1step = logical changing unit) | 8 (Decimal number) |
| | Driving mode 2 | Step number corresponding to one-stage vertical transfer (1step = logical changing unit) | 8 (Decimal number) |
| Data region (1~2) (3) | Driving mode 1 | stage number of vertical transfer | 1 (Decimal number) |
| | Driving mode 2 | stage number of vertical transfer | 2 (Decimal number) |
| Data region COM | Driving mode 1 & Driving mode 2 | Vertical transfer waveform pattern | <table><tr><th>Address</th><th>Output1 (V1)</th><th>Output2 (V2)</th><th>Output3 (V3)</th><th>Output4 (V4)</th></tr><tr><td>1</td><td>0</td><td>0</td><td>1</td><td>1</td></tr><tr><td>2</td><td>0</td><td>0</td><td>0</td><td>1</td></tr><tr><td>3</td><td>1</td><td>0</td><td>0</td><td>1</td></tr><tr><td>4</td><td>1</td><td>0</td><td>0</td><td>0</td></tr><tr><td>5</td><td>1</td><td>1</td><td>0</td><td>0</td></tr><tr><td>6</td><td>0</td><td>1</td><td>0</td><td>0</td></tr><tr><td>7</td><td>0</td><td>1</td><td>1</td><td>0</td></tr><tr><td>8</td><td>0</td><td>0</td><td>1</td><td>0</td></tr></table> |

FIG. 17

First register (Driving mode 1)

| | | | |
|---|---|---|---|
| RegisterA(1) | Driving mode 1 | Logical changing unit in V1 to V4 pulses | 12 (Decimal number) |
| RegisterA(2) | Driving mode 1 | Step number corresponding to one-stage vertical transfer (1step = logical changing unit) | 8 (Decimal number) |
| RegisterA(3) | Driving mode 1 | stage number of vertical transfer | 1 (Decimal number) |
| Register COM | Driving mode 1 & Driving mode 2 | Vertical transfer waveform pattern | <table><tr><th>Address</th><th>Output1 (V1)</th><th>Output2 (V2)</th><th>Output3 (V3)</th><th>Output4 (V4)</th></tr><tr><td>1</td><td>0</td><td>0</td><td>1</td><td>1</td></tr><tr><td>2</td><td>0</td><td>0</td><td>0</td><td>1</td></tr><tr><td>3</td><td>1</td><td>0</td><td>0</td><td>1</td></tr><tr><td>4</td><td>1</td><td>1</td><td>0</td><td>0</td></tr><tr><td>5</td><td>1</td><td>1</td><td>0</td><td>0</td></tr><tr><td>6</td><td>0</td><td>1</td><td>0</td><td>0</td></tr><tr><td>7</td><td>0</td><td>1</td><td>1</td><td>0</td></tr><tr><td>8</td><td>0</td><td>0</td><td>1</td><td>0</td></tr></table> |

FIG. 18

First register (Driving mode 2)

| | | |
|---|---|---|
| RegisterA(1) | Driving mode 2 | Logical changing unit in V1 to V4 pulses | 10 (Decimal number) |
| RegisterA(2) | Driving mode 2 | Step number corresponding to one-stage vertical transfer (1step = logical changing unit) | 8 (Decimal number) |
| RegisterA(3) | Driving mode 2 | stage number of vertical transfer | 2 (Decimal number) |
| Register COM | Driving mode 1 | | |
| | Driving mode 2 | | |

| Address | Output1 (V1) | Output2 (V2) | Output3 (V3) | |
|---|---|---|---|---|
| 1 | 0 | 0 | 1 | 1 |
| 2 | 1 | 0 | 0 | 1 |
| 3 | 1 | 0 | 0 | 1 |
| 4 | 0 | 1 | 0 | 0 |
| 5 | 0 | 1 | 0 | 0 |
| 6 | 0 | 0 | 1 | 0 |
| 7 | 0 | 0 | 1 | 0 |
| 8 | 0 | 0 | 1 | 0 |

FIG. 19

TIMING GENERATOR, SOLID-STATE IMAGING DEVICE AND CAMERA SYSTEM

FIELD OF THE INVENTION

The present invention relates to a timing generator for generating a timing pulse used for driving a sold-state imaging device.

BACKGROUND OF THE INVENTION

Video cameras and digital still cameras using a solid-state imaging device such as a Charge Coupled Device (CCD) are known. The development cycle for these cameras has been shortened and their costs also have decreased. Naturally, similar demands have been increased for components used in these cameras, and the reduction of the development cycle and the reduction of the cost for them are required.

A timing generator is an important component for generating a large number of timing pulses used for driving a solid-state imaging device. In order to realize an anti-shake function and an electronic zoom function of the cameras, a timing pulse complying with a vertical high-speed transfer mode of the solid-state imaging device is required.

JP S63(1988)-61560 A discloses a timing generator provided with a memory and a counter, in which the memory is for storing time-series data that represents a pattern of timing pulses and the counter is for sequentially assigning a readout address to this memory, which facilitates the change to specification.

JP H09(1997)-205591 A discloses a timing generator in which a timing pulse repeated in a horizontal direction and a timing pulse repeated in a vertical direction are obtained from separate memories, which is for the purpose of reducing memory capacity.

JP H10(1998)-257398 A discloses a timing generator provided with a decoder for decoding a rising pulse and a decoder for decoding a falling pulse, which allows a timing pulse to be configured with a program by means of a microcomputer.

JP 2002-51270 A discloses a timing generator that can reduce the amount of data to be stored in a built-in memory type timing generator that is for generating a timing pulse used for driving a solid-state imaging device and can realize a flexible function.

According to the timing generator described in JP 2002-51270 A, a large number of timing pulses having complicated waveforms that are used for driving the solid-state imaging device can be generated easily. However, after assembling it as an LSI for the timing generator, the pulse timing cannot be changed. Therefore, if the specification thereof needs to be changed, although the pulse timing can be changed easily, a separate LSI needs to be developed, thus posing a problem concerning the development cycle and the cost.

SUMMARY OF THE INVENTION

Therefore, with the foregoing in mind, it is an object of the present invention to provide a timing generator that can generate easily a timing of a pulse required for driving a solid-state imaging device and the like using timing generation information stored in a memory, wherein the timing generation information can be externally rewritten.

In order to cope with the above-stated problems, a timing generator of the present invention includes: a first memory circuit that stores timing generation information; a first register for holding the timing generation information in the first memory circuit; a first external input part for accessing the first register so as to rewrite data therein; a selector that selects one of the first memory circuit and the first external input part in order to conduct writing of data in the first register; and a pulse generation part that generates a pulse timing in accordance with the timing generation information held in the first register so as to output a single or a plurality of pulses.

BRIEF DESCRIPTION OF THE DRAWINGS

FIGS. 9A to 9D are tables showing timing generation information stored in each ROM of FIG. 8.

FIG. 11 is a table showing data of the timing generation information stored in the first memory circuit 10 of FIG. 10.

FIG. 12 is a table showing a data example in the case where the data of FIG. 11 written in the first register of FIG. 10 is rewritten externally.

FIG. 17 is a table showing the timing generation information stored in the first memory circuit 10A of FIG. 16.

FIG. 18 is a table showing the timing generation information in driving mode 1, which is stored in the first register 11A of FIG. 16.

FIG. 19 is a table showing the timing generation information in driving mode 2, which is stored in the first register 11A of FIG. 16.

DESCRIPTION OF THE PREFERRED EMBODIMENTS

Figure 1:
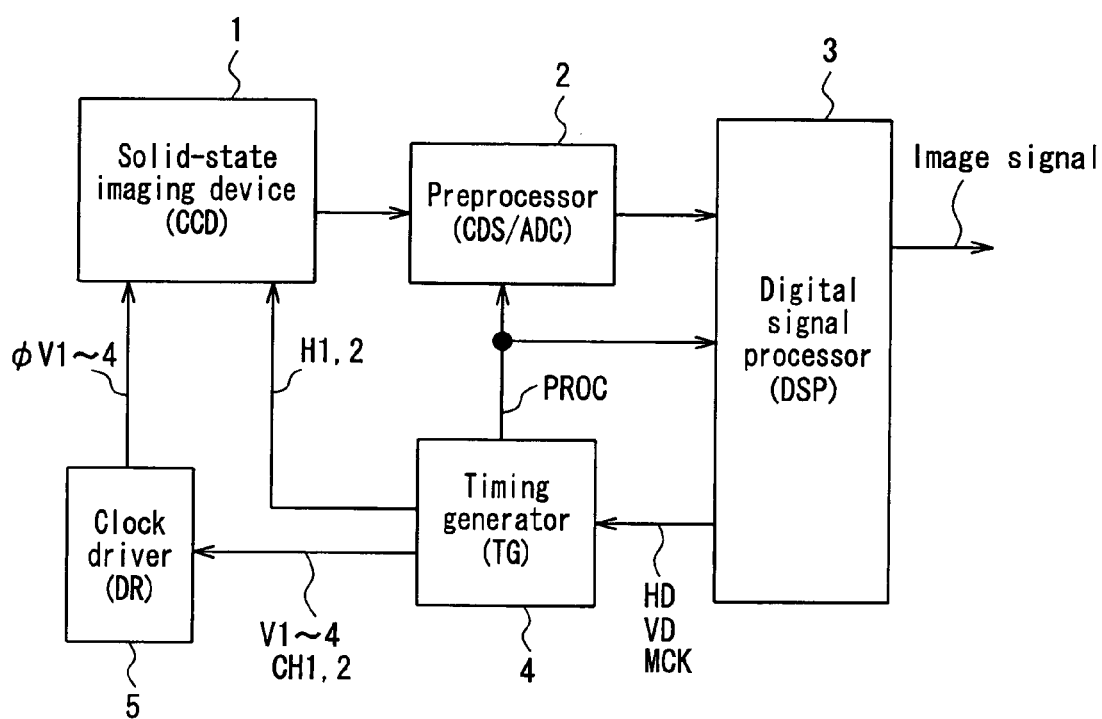
FIG. 1 is a block diagram showing a schematic configuration example of a CCD camera that is a solid-state imaging device of one embodiment of the present invention.

According to the timing generator of the present invention, timing generation information is configured in a first memory circuit, whereby a pulse timing required for driving and signal processing of a solid-state imaging device can be generated easily and the timing generation information can be rewritten externally as well. Therefore, even when the specifications need to be changed after assembling it in an LSI as a timing generator, there is no need to remake the LSI.

Furthermore, in the case of a programmable timing generator using timing generation information externally input and not using a memory circuit, a time required for inputting all of the timing generation information is increased at the time of starting a power source. According to the present invention, however, timing generation information is configured in the first memory circuit, and therefore there is no need to input the timing generation information excluding the information concerning the timing change, so that a starting time after turning the power of the camera ON can be reduced.

In the timing generator of the present invention, a second external input part that supplies the selector with a selection signal further may be provided. With this configuration, the timing generation information can be rewritten through the first external input part in accordance with the data of the second external input part.

Furthermore, a selector control part that generates a selection signal for the selector from data input from the first external input part further may be provided. With this configuration, the timing generation information can be rewritten through the first external input part in accordance with the data of the first external input part.

Furthermore, the timing generator preferably may be configured as follows: the first memory circuit stores pulse generation information complying with N different modes (N denotes a natural number), the pulse generation information containing: data (COM) common to the respective modes; and data (D1 to DN) different for each mode, and the first register holds the data region (COM) and at least one of the data (D1 to DN). If the selector selects the first memory circuit, data corresponding to a configured mode among the data D1 to DN is written in the first register, and if the selector selects the first external input part, data corresponding to a configured mode is written from the first external input part to the first register.

With this configuration, with respect to a plurality of types of driving modes, a pulse timing for a desired driving mode can be generated simply by rewriting the timing generation information partially.

Furthermore, preferably, the timing generator further includes: a second register that holds control function information as the timing generator and supplies the same to the pulse generation part; and a second external input part that supplies the selector with a selection signal. The first external input part enables accessing to the first register and the second register independently so as to rewrite internal data therein. With this configuration, when data is input to the first register and the second register, the external input part can be made common to them.

In the above-stated configurations, preferably, during a time period when data is written in the first register, an output of the pulse generation part is fixed at any one of a high, a low and a high impedance state, and after completion of the writing of the data in the first register, a pulse is output in accordance with the timing generation information held in the first register. With this configuration, the output logic of the pulse generation device can be set arbitrarily during the time period when the timing generation information is written in the first register.

Furthermore, preferably, during a time period when writing is conducted from the first memory circuit or the first external input part to the first register, the timing generator is initialized except for the first memory circuit and the first register. With this configuration, the timing generator can be initialized except for the first memory circuit and the first register during the time period of data inputting to the first register.

Furthermore, preferably, the timing generator further includes: a second register that holds control function information as the timing generator and supplies the same to the pulse generation part and that is configured so that data is rewritable externally through the first external input part; an input control part that selects either the first register or the second register in which data input from the first external input part is to be written; a second external input part that supplies the selector with a selection signal; and a third external input part that supplies the input control part with a selection signal. The input control part outputs the data input from the first external input part to either the selector or the second register in accordance with data of the third external input part, and the selector selects data to be input in the first register from an output of the first memory circuit and an output of the input control part in accordance with data of the second external input part.

With this configuration, the data input part for rewriting the data of the first register and the second register externally can be made common to them.

In this configuration, preferably, during a time period when the input control part outputs the data of the first external input part to the selector and the selector selects the output of the input control part and writes the data of the first external input part to the first register, the timing generator is initialized except for the first memory circuit and the first register.

With this configuration, the data input part for rewriting the data of the first register and the second register externally can be made common to them and the timing generator can be initialized except for the first memory circuit and the first register during the time period of data inputting to the first register. Furthermore, using the data inputting to the third external input part and the data of the second external input part, the data input from the first external input part can be rewritten in the first and the second registers.

Preferably, this configuration further includes a counter circuit that reverses an output from an initial state in response to an edge of a pulse input from the third external input part as a trigger, and holds the same, wherein the reversed state returns to the initial state after counting a predetermined time period. The input control part outputs the data input from the first external input part to either the selector or the second register in accordance with the output of the counter circuit.

With this configuration, the data input part for rewriting the data of the first register and the second register externally can be made common to them, and using the pulse inputting to the third external input part and the data of the second external input part, the data of the first and the second registers can be rewritten in accordance with the data input from the first external input part. The timing generator can be initialized except for the first memory circuit and the first register during the time period of data inputting to the first register.

Furthermore, preferably, the above configuration further includes a second memory circuit; and a data comparator that compares the control function information held by the second register with data in the second memory circuit. The control function information held in the second register is changeable in accordance with a result of the comparison by the data comparator. In this configuration, preferably, data in the second register is rewritten in an arbitrary logic of a L or a H level in accordance with an output of the data comparator.

This configuration can prevent inappropriate data from being configured as data of the specific addresses of the second register.

A solid-state imaging device or a camera system provided with the timing generator having any one of the above-stated configurations can be provided.

The following specifically describes a timing generator, a solid-state imaging device and a camera system of embodiments of the present invention, with reference to the drawings.

Embodiment 1

Firstly, a configuration and operations of a solid-state imaging device to which a timing generator of Embodiment 1 is applied will be described below. FIG. 1 is a block diagram showing a schematic configuration example of a CCD camera that is the solid-state imaging device. In FIG. 1, reference numeral 1 denotes an interlace scan type solid-state imaging device (CCD), for example, whose output is subjected to procedures such as CDS (correlated double sampling) and ADC (analog-digital conversion) by a preprocessor LSI 2. An output of the preprocessor 12 undergoes processing such as pixel interpolation and processing concerning brightness and color-difference signal by a digital signal processor (DSP) LSI 3 so as to be output as an image signal. A timing generator (TG) LSI 4 generates timing pulses H1, H2, V1 to V4 and CH1 and CH2, which are used for driving the solid-state imaging device 1. A clock driver (DR) LSI 5 supplies driving pulses φV1 to 4 that are generated from V1 to V4 and CH1 and CH2 to the solid-state imaging device 1.

The timing generator 4 is supplied with pulses for a horizontal synchronizing signal HD, a vertical synchronizing signal VD and a clock signal MCK from the digital signal processor LSI 3 so as to generate the above-stated timing pulses H1, H2, V1 to V4, CH1 and CH2 and supplies the preprocessor LSI 2 and the digital signal processor LSI 3 with a signal processing pulse PROC. Herein, a configuration in which the pulses for the horizontal and the vertical synchronizing signals are generated by the timing generator 4 also is available.

Figure 2:
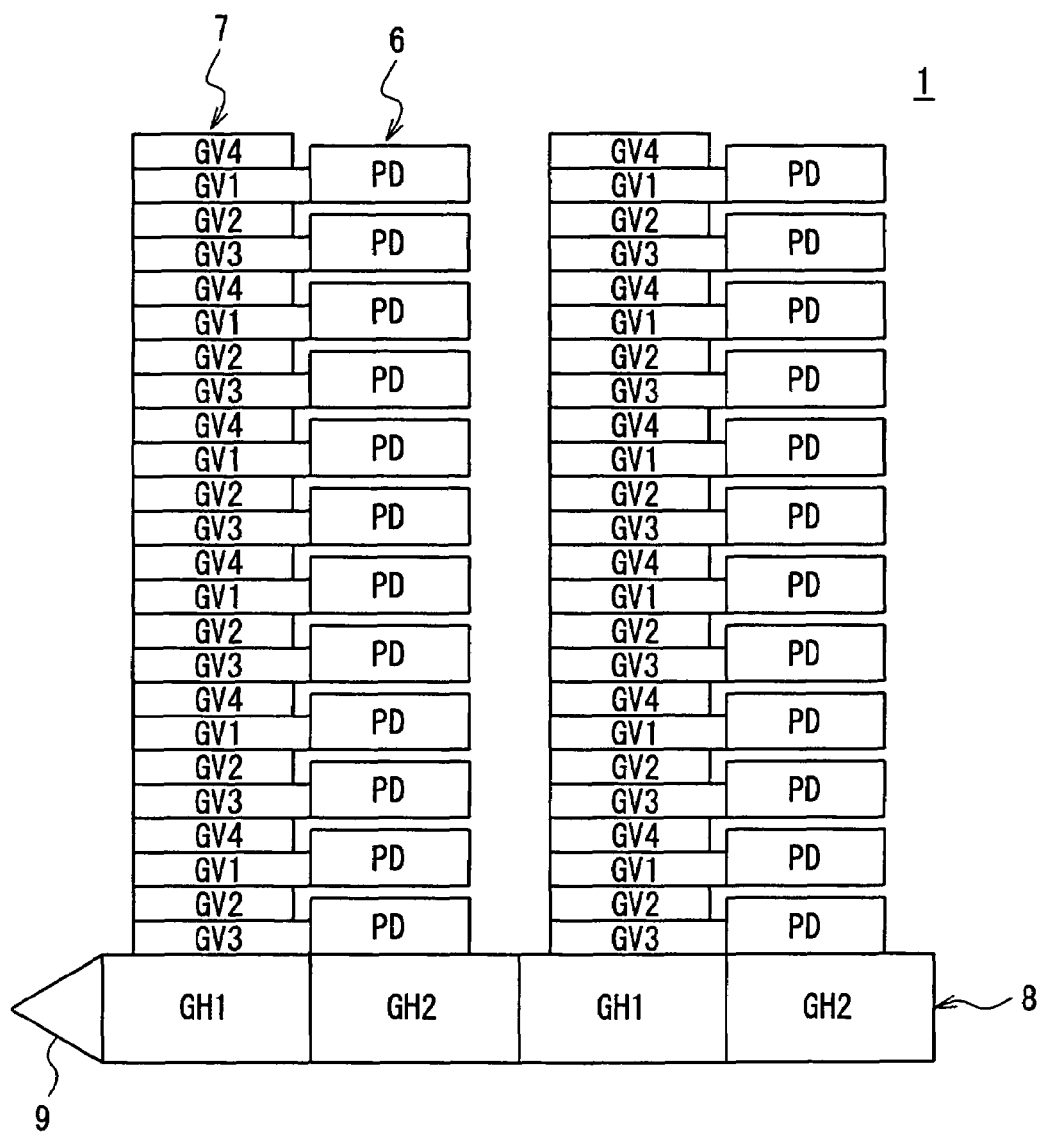
FIG. 2 is a conceptual diagram showing a configuration example of gates of the solid-state imaging device (CCD) in FIG. 1.

FIG. 2 shows a configuration example of gates of the solid-state imaging device 1 in FIG. 1. In FIG. 2, reference numeral 6 denotes a photodiode (PD), 7 denotes a vertical transfer part including four-phase gates GV1, GV2, GV3 and GV4, 8 denotes a horizontal transfer part including two-phase gates GH1 and GH2, and 9 denotes a charge detection part. Although FIG. 2 illustrates schematically the reduced number of the photodiodes 6 and the vertical transfer part 7, in an actual solid-state imaging device 1 the combinations of the photodiodes 6 and the vertical transfer part 7 are aligned so as to correspond to the horizontal pixels in number. The gates of the vertical transfer part 7 include the arrangement of GV3, GV2, GV1 and GV4 that are repeated in this order from the side of the horizontal transfer part 8. The driving pulses φV1 to φV4 shown in FIG. 1 are supplied to the gates GV1 to GV4 of the vertical transfer part 7, respectively. The timing pulses H1 and H2 shown in FIG. 1 are supplied to the gates GH1 and GH2 of the horizontal transfer part 8, respectively.

The procedure for reading out through the solid-state imaging device 1 of FIG. 2 is as follows: high-voltage (about 15 V) driving pulses φV1 and φV3 are applied to the GV1 and GV3 of the vertical transfer part 7, respectively, whereby charge is read out from the photodiodes 6 to the vertical transfer part 7. The readout charge of GV1 and the readout charge of GV3 that adjoins to GV1 on the side of the horizontal transfer part 8 are mixed so as to obtain a signal charge corresponding to one stage. Alternatively, the readout charge of GV3 and the readout charge of GV1 that adjoins to GV3 on the side of the horizontal transfer part 8 are mixed so as to obtain a signal charge corresponding to one state. Thereafter, driving pulses φV1 to φV4 are input to the gates GV1 to GV4 of the vertical transfer part 7. Thereby, the charge corresponding to two lines of the photodiodes 6 is transferred concurrently to the horizontal transfer part 8, which is conducted once during one horizontal scanning cycle. The horizontal transfer part 8 is supplied with timing pulses H1 and H2 so as to transfer the charge of the horizontal transfer part 8, so that a signal is output from the charge detection part 9.

Figure 3:
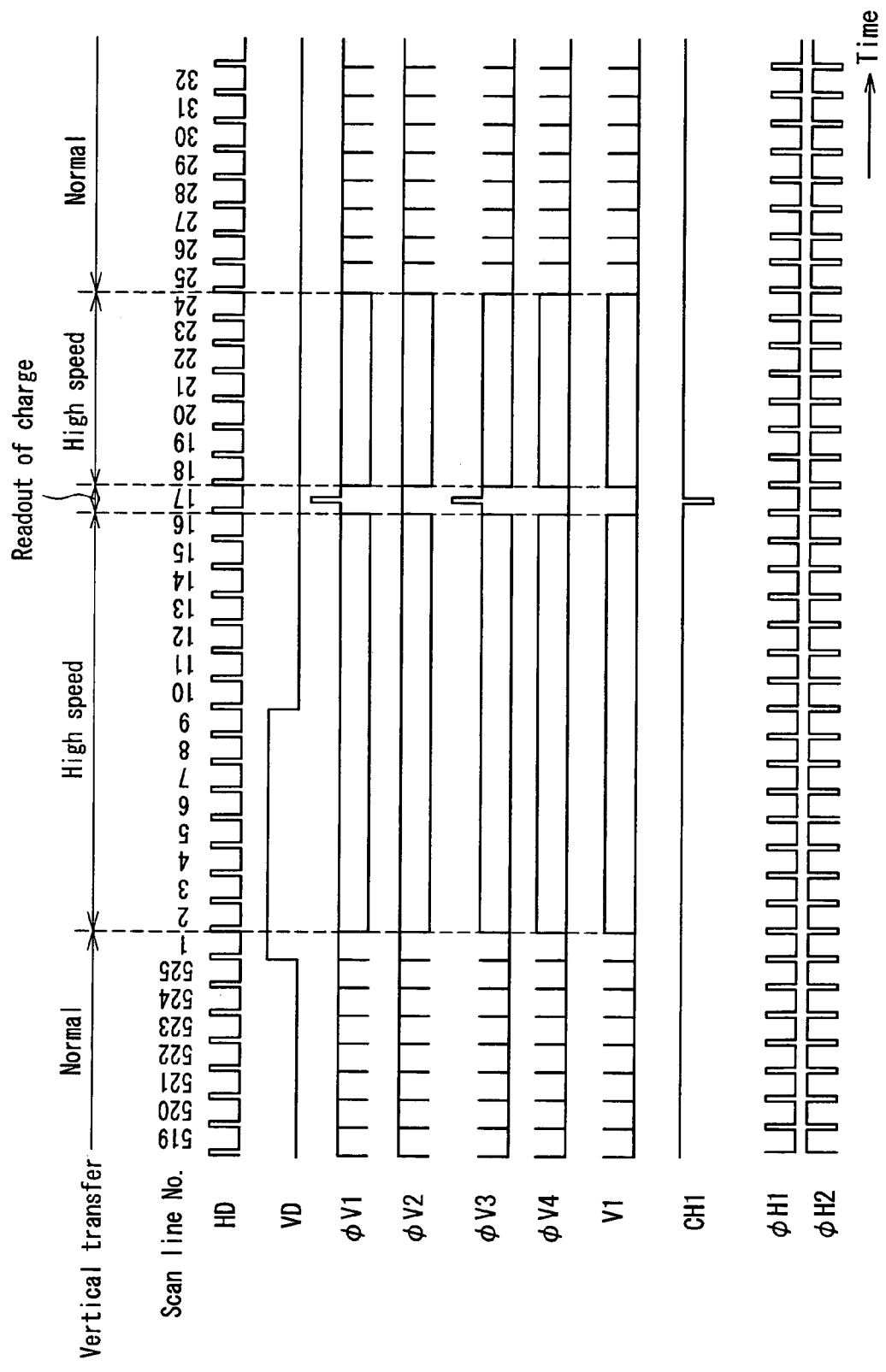
FIG. 3 is a timing chart showing an example of waveforms of major signals of FIG. 1 in driving mode 1.

FIG. 3 shows an example of waveforms of major signals in FIG. 1 (in the vicinity of a VD pulse). V1 and CH1 in FIG. 3 are timing pulses output from the timing generator 4, which are rendered as three-values or subjected to voltage conversion by the clock driver 5 so as to be a driving pulse φV1. Timing pulses V2 to V4, which are not illustrated, are subjected to voltage conversion by the clock driver 5 so as to be φV2 to φV4, respectively. The waveforms of FIG. 3 show the example where a normal transfer mode and a vertical high-speed transfer mode are mixed in one vertical scan cycle, which is for realizing an anti-shake function and an electronic zoom function of a camera. More specifically, about 15 V of φV1 and φV3 are applied at the seventeenth-line (the scanning line with the number 17), whereby the charge is read out from the photodiodes 6 to the vertical transfer part 7. After reading out the charge and consecutively conducting vertical high-speed transfer by φV1 to 4, normal transfer is carried out. After the normal transfer is carried out by φV1 to 4 until a VD pulse is input next, the vertical high-speed transfer is initiated again. The driving mode of the timing chart shown in FIG. 3 will be referred to as a driving mode 1.

Figure 4:
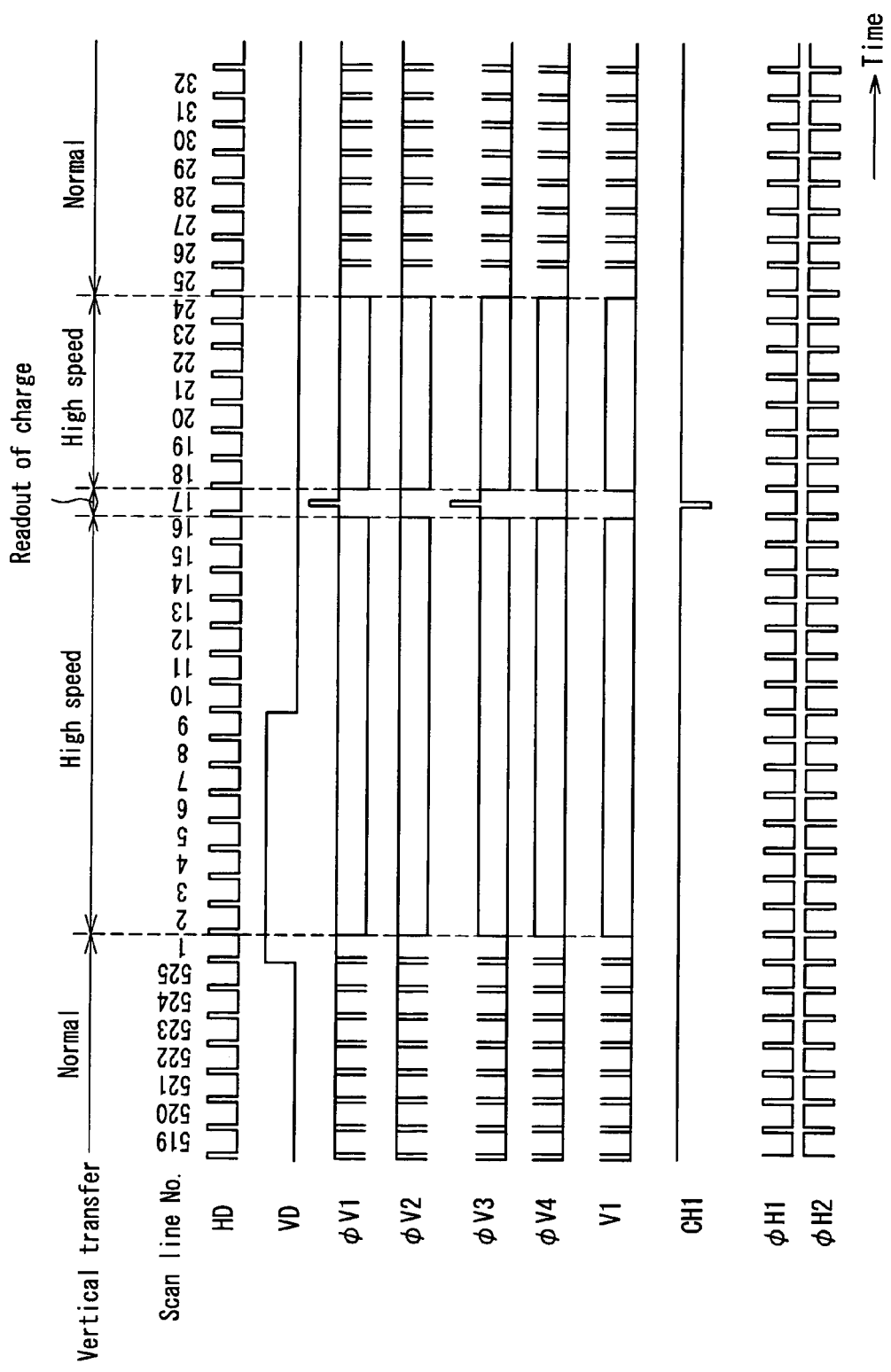
FIG. 4 is a timing chart showing an example of waveforms of major signals of FIG. 1 in driving mode 2.

FIG. 4 shows an example of waveforms of major signals in FIG. 1 (in the vicinity of a VD pulse) similarly to FIG. 3, which is the case of a driving mode 2. A difference from the driving mode 1 of FIG. 3 resides in that the normal transfer period for vertical transfer carries out one-stage transfer in the driving mode 1, but carries out two-stage transfer in the driving mode 2.

Figure 5:
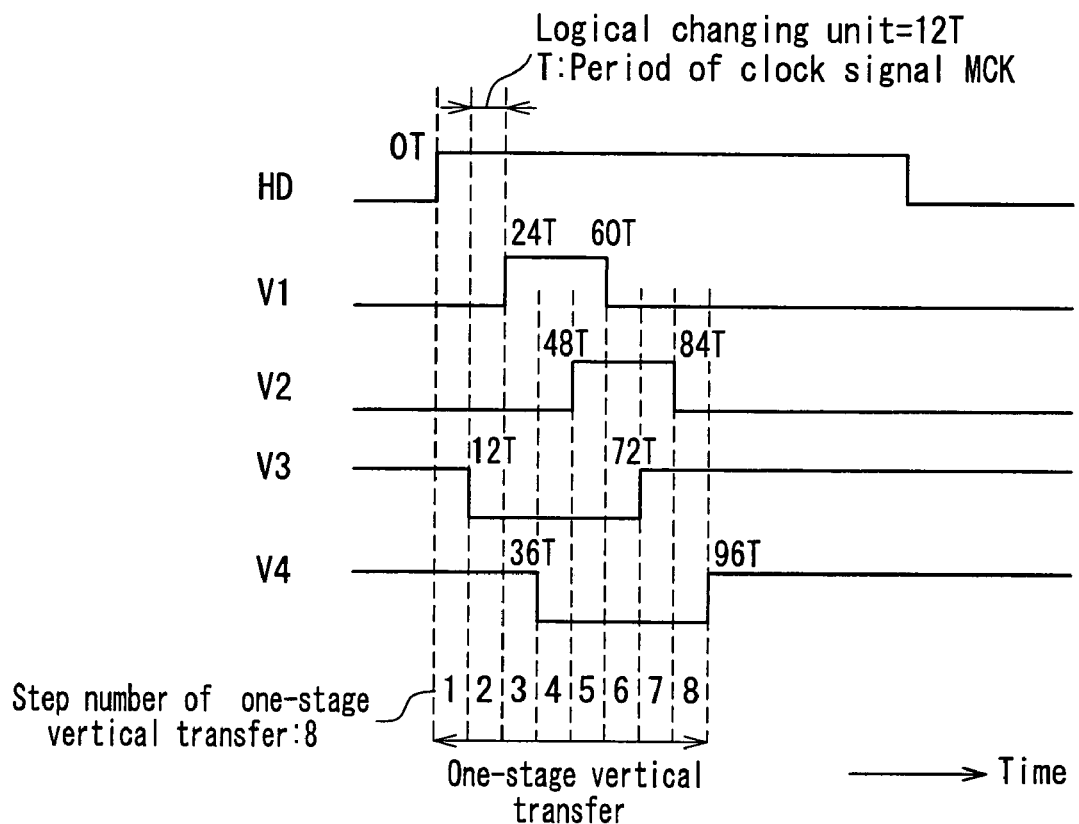
FIG. 5 is a timing chart showing an example of a waveform of a normal transfer period in FIG. 3 in detail.
Figure 6:
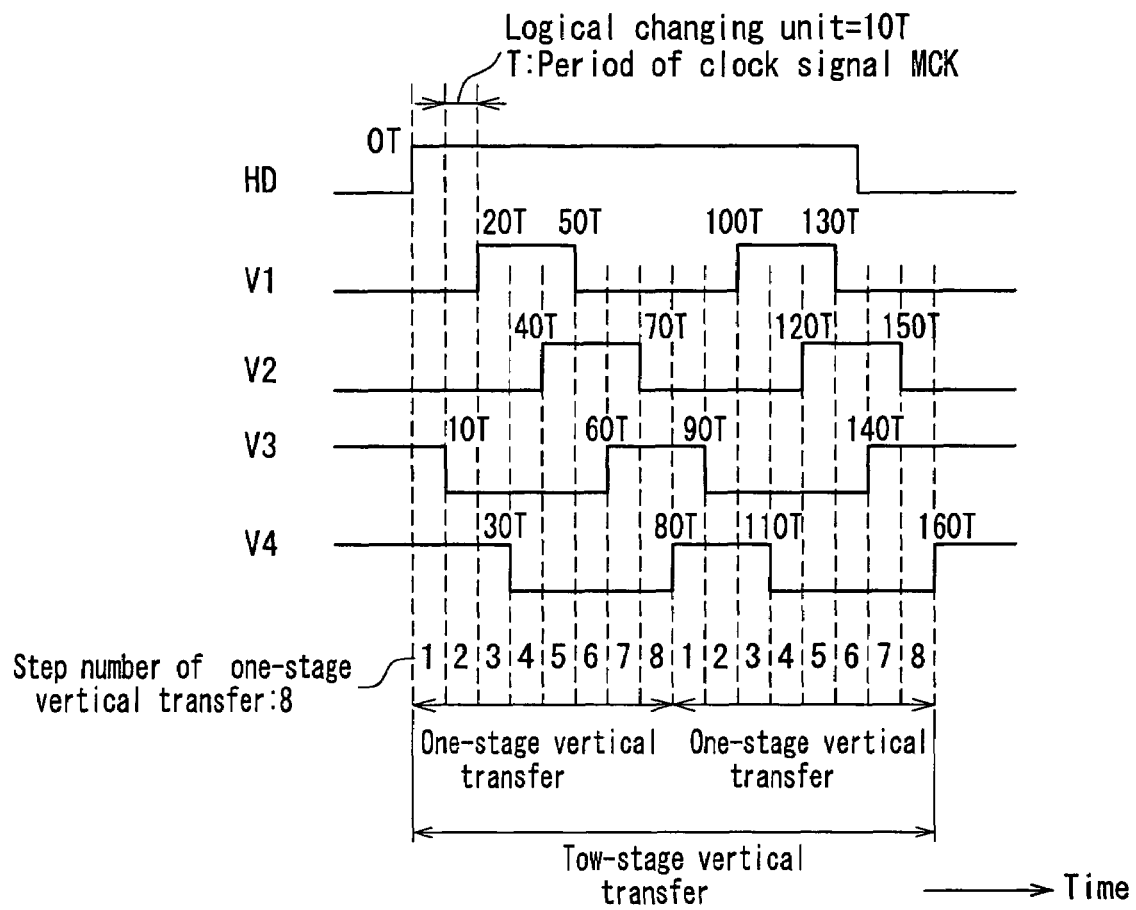
FIG. 6 is a timing chart showing an example of a waveform of a normal transfer period in FIG. 4 in detail.

FIG. 5 shows the details of the waveforms of the normal transfer period in the driving mode 1 and FIG. 6 shows the details of the waveforms of the normal transfer period in the driving mode 2. In FIG. 5 and FIG. 6, T represents a period of a clock signal MCK. The length of the time duration from a changing point of a pulse to the next changing point of the pulse, i.e., a logical changing unit, is represented as one step. The waveforms of the normal transfer period in the driving mode 1 shown in FIG. 5 have a logical changing unit of 12T, a period for the pulse change of V1 to 4, i.e., the step number corresponding to one stage of the vertical transfer, is 8 and one-stage vertical transfer is carried out. Note here that the period of one stage of the vertical transfer corresponds to 96 clocks. The waveforms of the normal transfer period in the driving mode 2 shown in FIG. 6 have a logical changing unit of 10T, the step number corresponding to one stage of the vertical transfer is 8 and two-stage vertical transfer is carried out.

Figure 7:
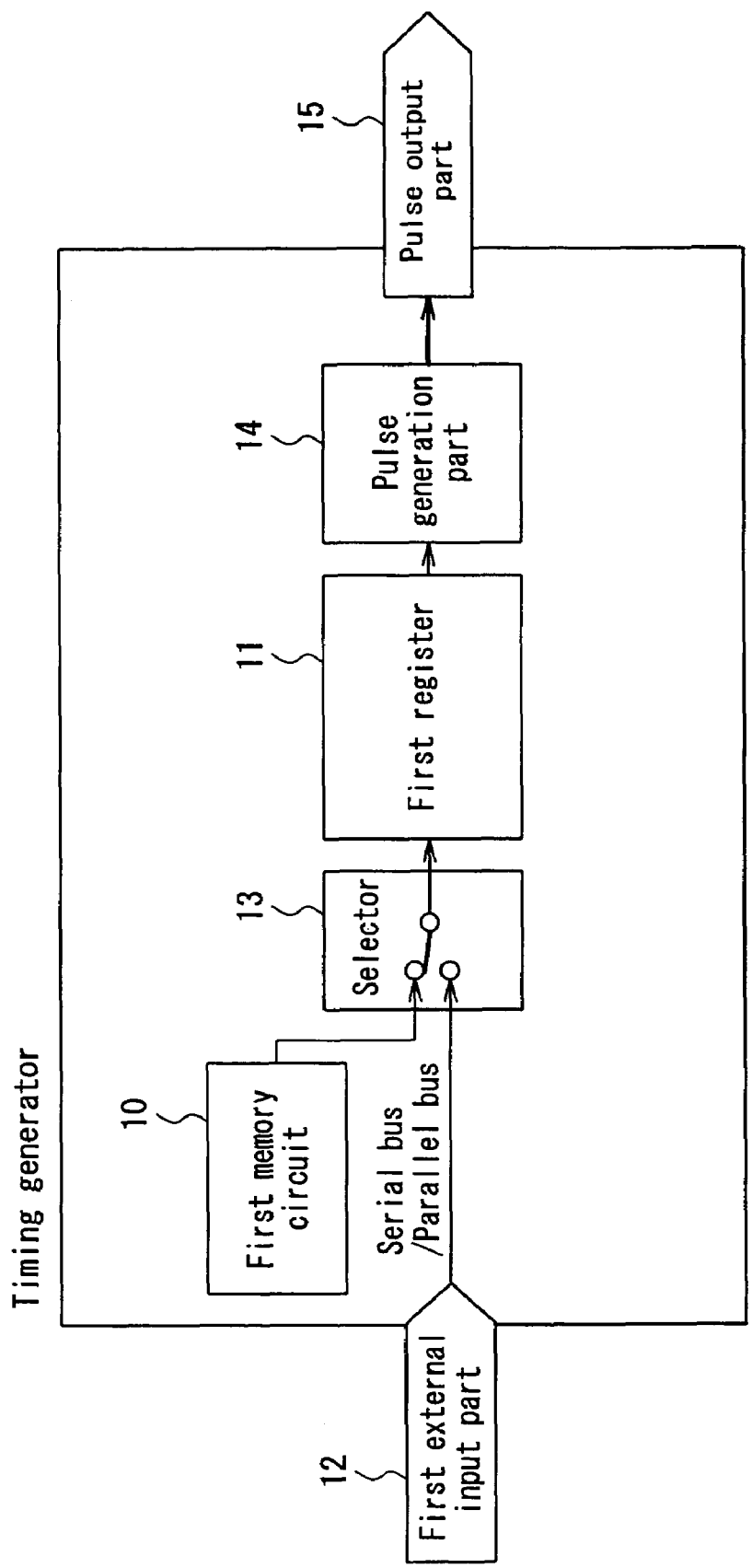
FIG. 7 is a block diagram showing a timing generator of Embodiment 1.

FIG. 7 shows a configuration of the timing generator of Embodiment 1. In the present embodiment, the configuration and the operations that are applied to the timing generator 4 of FIG. 1 are explained. In FIG. 7, reference numeral 10 denotes a first memory circuit in which timing generation information is stored and 11 denotes a first register that holds information of the first memory circuit 10. The information in the first register 11 can be rewritten externally from a first external input part 12. A selector 13 enables the selection between the outputs from the first memory circuit 10 and the first external input part 12 as data to be written to the first register 11. A pulse generation part 14 generates timing pulses in accordance with the timing generation information of the first register 11 and a pulse output part 15 allows the output from the pulse generation part 14 to be output as the output of the timing generator.

Figure 8:
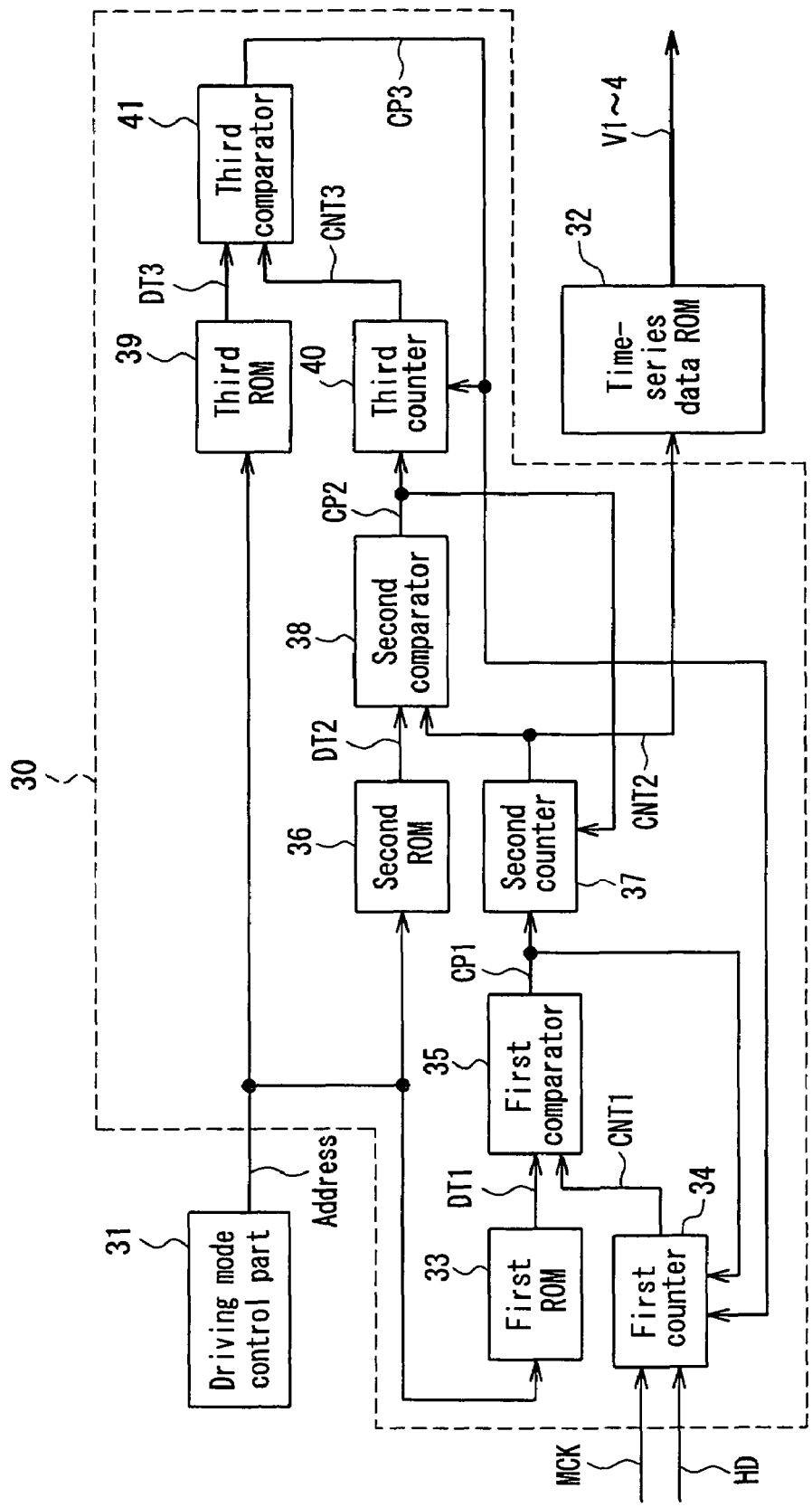
FIG. 8 is a block diagram for explaining operations of the timing generator.

Referring now to FIG. 8, operations of generating timing pulses by the pulse generation part 14 in accordance with the timing generation information stored in the first memory circuit 10 will be described below. FIG. 8 shows the configuration in which functions of the first register 11 and the pulse generation part 14 are decomposed for the intelligibility of the operations. Accordingly, the substantial configuration and operations are identical with those of the combination of the first register 11 and the pulse generation part 14. Note here that the operations of generating V1 to V4 only will be mentioned below.

The device of FIG. 8 is composed of a counter part 30, a driving mode control part 31 and a time-series data ROM 32. The counter part 30 is composed of: a first ROM 33; a first counter 34; a first comparator 35; a second ROM 36; a second counter 37; a second comparator 38; a third ROM 30, a third counter 40 and a third comparator 41. When a HD pulse is input as a trigger in the first counter 34, then the counter part 30 carries out the multiple count of a MCK pulse. The first, the second and the third ROMs 33, 36 and 39 store the respective control values.

The first counter 34 starts to count the MCK pulse in response to the HD pulse, and initializes a count value in response to an initialization pulse CP1 and stops the counting in response to a stop pulse CP3. The first comparator 35 compares a control value DT1 read out from the first ROM 33 with a count value CNT1 counted by the first counter 34, and every time both of the values agree with each other, the first comparator 35 outputs a control pulse CP1 at the timing of the next MCK pulse. The control pulse CP1 is supplied to the second counter 37, as well as being supplied to the first counter 34 as the initialization pulse.

The second counter 37 counts the control pulse CP1 output from the first comparator 35 and initializes a count value in response to an initialization pulse CP2. The second comparator 38 compares a control value DT2 read out from the second ROM 36 with a count value CNT2 counted by the second counter 37, and every time both of the values agree with each other, the second comparator 38 outputs a control pulse CP2 at the timing of the next CP1 pulse. The control pulse CP2 is supplied to the third counter 40, as well as being supplied to the second counter 37 as the initialization pulse.

The third counter 40 counts the control pulse CP2 output from the second comparator 38 and initializes a count value in response to an initialization pulse CP3. The third comparator 41 compares a control value DT3 read out from the third ROM 39 with a count value CNT3 counted by the third counter 40, and every time both of the values agree with each other, the third comparator 41 outputs a control pulse CP3 at the timing of the next CP2 pulse. The control pulse CP3 is supplied to the third counter 40 as the initialization pulse, as well as being supplied to the first counter 34 as the stop pulse.

The first, the second and the third counter 34, 37 and 40 hold an operation suspension state until a HD pulse is input. After the HD pulse is input, these counters start their operations and continue the operations until the third comparator 41 outputs the CP3 pulse. At the time when the third comparator 41 outputs the CP3 pulse, the first, the second and the third counters 34, 37 and 40 are reset to their initialization values and hold the operation suspension state until the HD pulse is input again. Note here that the initialization values of the first, the second and the third counters of the present embodiment are each set at "1".

The driving mode control part 31 supplies an address so as to switch control values read out from the first, the second and the third ROMs 33, 36 and 39 depending on either the normal transfer mode or the vertical high-speed transfer mode being carried out. Herein, it is assumed that address 1 represents the vertical high-speed transfer mode and address 2 represents the normal transfer mode.

The time-series data ROM 32 is a memory for storing time-series data that represents the repeated pattern of a logic level of an output pulse. The time-series data ROM 32 receives the count value CNT2 counted by the second counter 37 as a readout address and supplies an output pulse in accordance with the time-series data as pulses of V1 to 4.

FIGS. 9A-9D show timing generation information each stored in the first ROM 33, the second ROM 36, the third ROM 39 and the time-series data ROM 32 of FIG. 8, which correspond to data for generating pulse timings of V1 to V4 of the normal transfer period for vertical transfer shown in FIGS. 5 and 6. Since the pulse timings of V1 to V4 in the driving mode 1 of FIG. 5 have the logical changing unit of 12T, the first ROM 33 stores 12 (decimal number) as the timing generation information as shown in FIG. 9A. Since the step number corresponding to one-stage vertical transfer is 8, the second ROM 36 stores 8 (decimal number) as the timing generation information as shown in FIG. 9B. Since the vertical transfer includes one stage, the third ROM 39 stores 1 (decimal number) as the timing generation information as shown in FIG. 9C. As the vertical transfer waveform patterns of V1 to V4, the vertical transfer waveform pattern shown in FIG. 9D is stored in the time-series data ROM 32.

Next, as for the pulse timing of V1 to V4 in the driving mode 2 of FIG. 6, since its logical changing unit is 10T, the first ROM 33 stores 10 (decimal number) as the timing generation information as shown in FIG. 9A. Since the step number corresponding to one-stage vertical transfer is 8, the second ROM 36 stores 8 (decimal number) as the timing generation information as shown in FIG. 9B. Since the vertical transfer includes two stages, the third ROM 39 stores 2 (decimal number) as the timing generation information as shown in FIG. 9C. As the vertical transfer waveform patterns of V1 to V4, the vertical transfer waveform pattern shown in FIG. 9D is stored in the time-series data ROM 32. That is the explanation for the operations to generate the pulses in accordance with the timing generation information.

Figure 10:
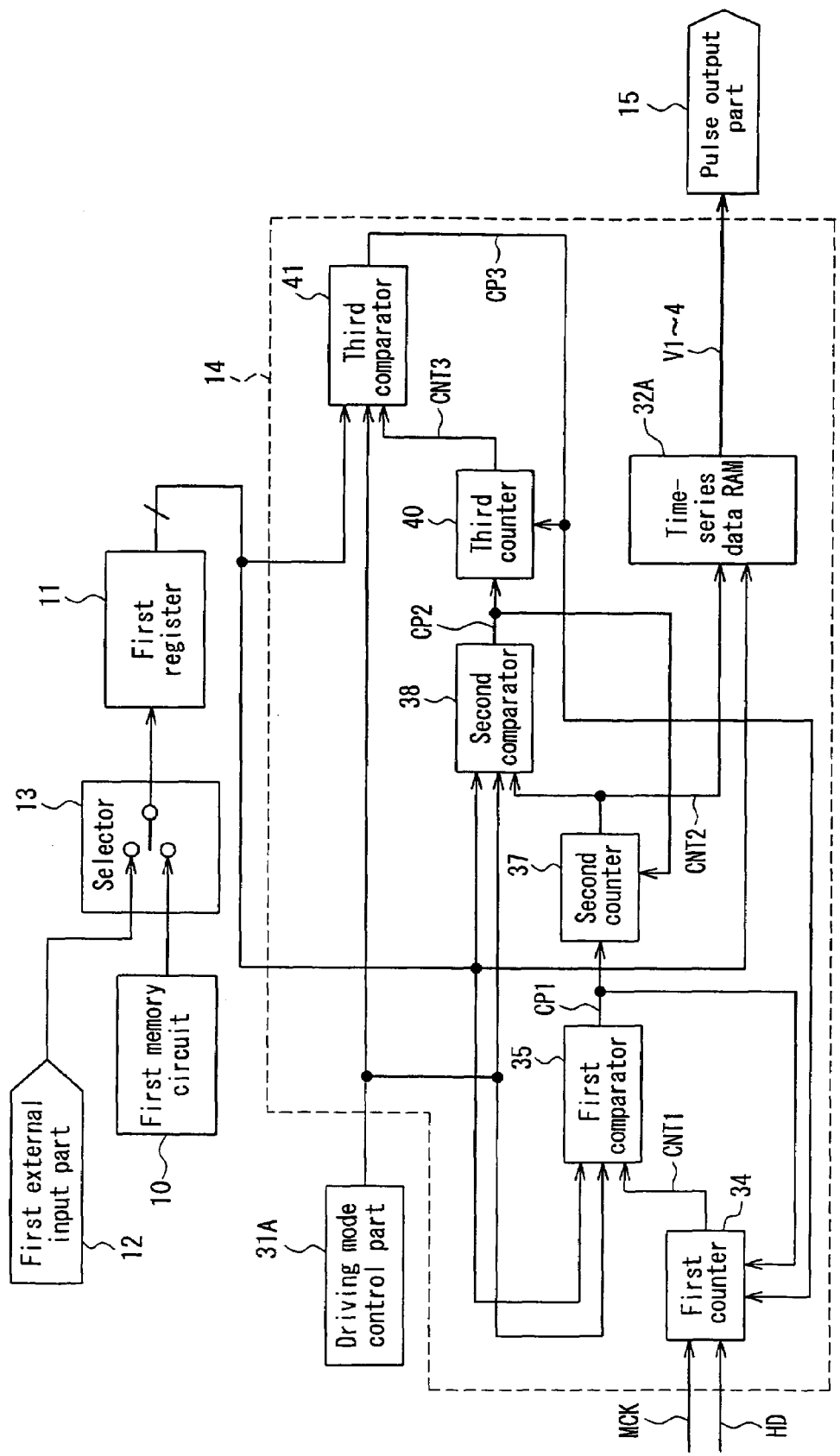
FIG. 10 is a block diagram specifically illustrating a configuration of a pulse generation part of FIG. 7.

FIG. 10 shows a specific circuit configuration of the timing generator of the present embodiment. In FIG. 10, a first memory circuit 10, a first register 11, a first external input part 12, a selector 13, a pulse generation part 14 and a pulse output part 15 correspond to the respective elements shown in FIG. 7.

In FIG. 10, a first counter 34, a first comparator 35, a second counter 37, a second comparator 38, a third counter 40 and a third comparator 41 of the pulse generation part 14 correspond to those shown in FIG. 8, respectively, and functions and operations of them are the same as those of FIG. 8. In the pulse generation part 14 of FIG. 10, however, the first ROM 33, the second ROM 36 and the third ROM 39 of FIG. 8 are removed. The data corresponding to those supplied from these ROMs are supplied from the first register 11 to each of the first comparator 35, the second comparator 38 and the third comparator 41. Furthermore, the time-series data ROM 32 of FIG. 8 is changed to a time-series data RAM 32A having a function of writing a vertical transfer waveform pattern from the first register 11 also.

A driving mode control part 31A controls the operations of supplying the first comparator 35, the second comparator 38, the third comparator 41 and the time-series data RAM 32A with timing generation information in accordance with the driving mode from the first register 11.

The following describes operations by this timing generator, which concerns the case where the timing is generated in accordance with the timing generation information stored in the first memory circuit 10 and the case where the timing is generated in accordance with the timing generation information input from the first external input part 12.

Firstly, referring to FIG. 11 showing the timing generation information in the first memory circuit 10, the case where the timing is generated in accordance with the timing generation information stored in the first memory circuit 10 will be described. The timing generation information of FIG. 11 is for generating pulse timings of V1 to V4 of the normal transfer period in the driving mode 1 shown in FIG. 5 and for generating pulse timings of V1 to V4 of the normal transfer period in the driving mode 2 shown in FIG. 6, whose numerical values and data are the same as those shown in FIGS. 9A to 9D. That is, as for the pulse timings of V1 to V4 of the normal transfer period in the driving mode 1, 12 (decimal number) is stored as the logical changing unit, 8 (decimal number) is stored as the step number corresponding to one stage of vertical transfer and 1 (decimal number) is stored as the number of the stages of the vertical transfer. The vertical transfer waveform patterns of V1 to V4 also are stored. Similarly, as for the pulse timings of V1 to V4 in the driving mode 2, 10 (decimal number) is stored as the logical changing unit, 8 (decimal number) is stored as the step number corresponding to one stage of vertical transfer and 2 (decimal number) is stored as the number of the stages of the vertical transfer. The vertical transfer waveform patterns of V1 to V4 also are stored.

When the selector 13 selects the first memory circuit 10, the timing generation information in the first memory circuit 10 is written in the first register 11 as it is. That is, the timing generation information written in the first register 11 is the same as that shown in FIG. 11, and therefore the explanation will be given with reference to FIG. 11.

Among the timing generation information written in the first register 11, the data of the logical changing unit is input to the first comparator 35, the data of the step number corresponding to one-stage of vertical transfer is input to the second comparator 38, the data of the number of the stages of vertical transfer is input to the third comparator 41 and the vertical transfer waveform patterns of V1 to V4 are input to the time-series data RAM 32A. The control by the driving mode control part 31A allows the selective input of the timing generation information in the driving mode 1 or in the driving mode 2.

Such timing generation information allows the pulse timings of V1 to V4 of the normal transfer period in the driving mode 1 of FIG. 5 and the pulse timings of V1 to V4 of the normal transfer period in the driving mode 2 of FIG. 6 to be generated. Since the operations of the pulse generation part 14 are the same as those in FIG. 8, their explanations are not repeated.

Next, the following is the description on the case where the timing is generated in accordance with the timing generation information input from the first external input part 12. In this case, the selector 13 selects the first external input part 12, which allows desired timing generation information to be written arbitrarily in the first register 11.

FIG. 12 shows the timing generation information, which corresponds to the timing generation information in the first register 11 shown in FIG. 11 modified so that the logical changing unit of the V1 to V4 pluses in the driving mode 1 is rewritten from 12 (decimal number) to 5 (decimal number).

Figure 13:
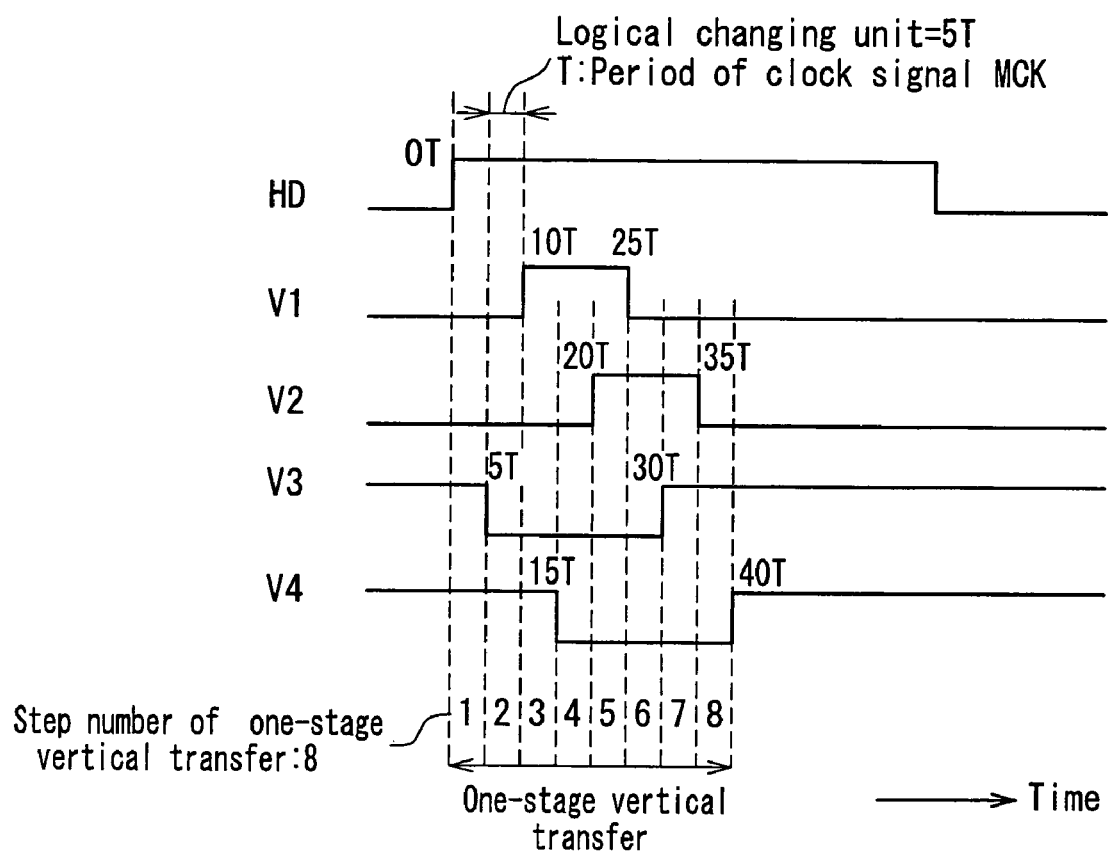
FIG. 13 is a detailed timing chart showing an example of a waveform of a normal transfer period in driving mode 1 in accordance with the timing generation information of FIG. 12.

FIG. 13 shows pulse timings of V1 to V4 of the normal transfer period in the driving mode 1 that is obtained from the timing generation information shown in FIG. 12.

According to this timing generation information, the pulse timings of V1 to V4 of the normal transfer period in the driving mode 1 have the logical changing unit of 5 (decimal number), the V3 pulse changes from H level to L level at 5T, for example, and thereafter the pulses of V1 to V4 change their output logics at every 5T.

As stated above, according to the present embodiment, the pulse timings in accordance with the timing generation information of the first memory circuit 10 can be generated easily, and the timing generation information can be rewritten through the first external input part 12. Therefore, even after being assembled as an LSI, a change to the specification of the pulse timings can be made.

Note here that the data formats of the first memory circuit 10 and the first register 11 are not limited especially.

Embodiment 2

Figure 14:
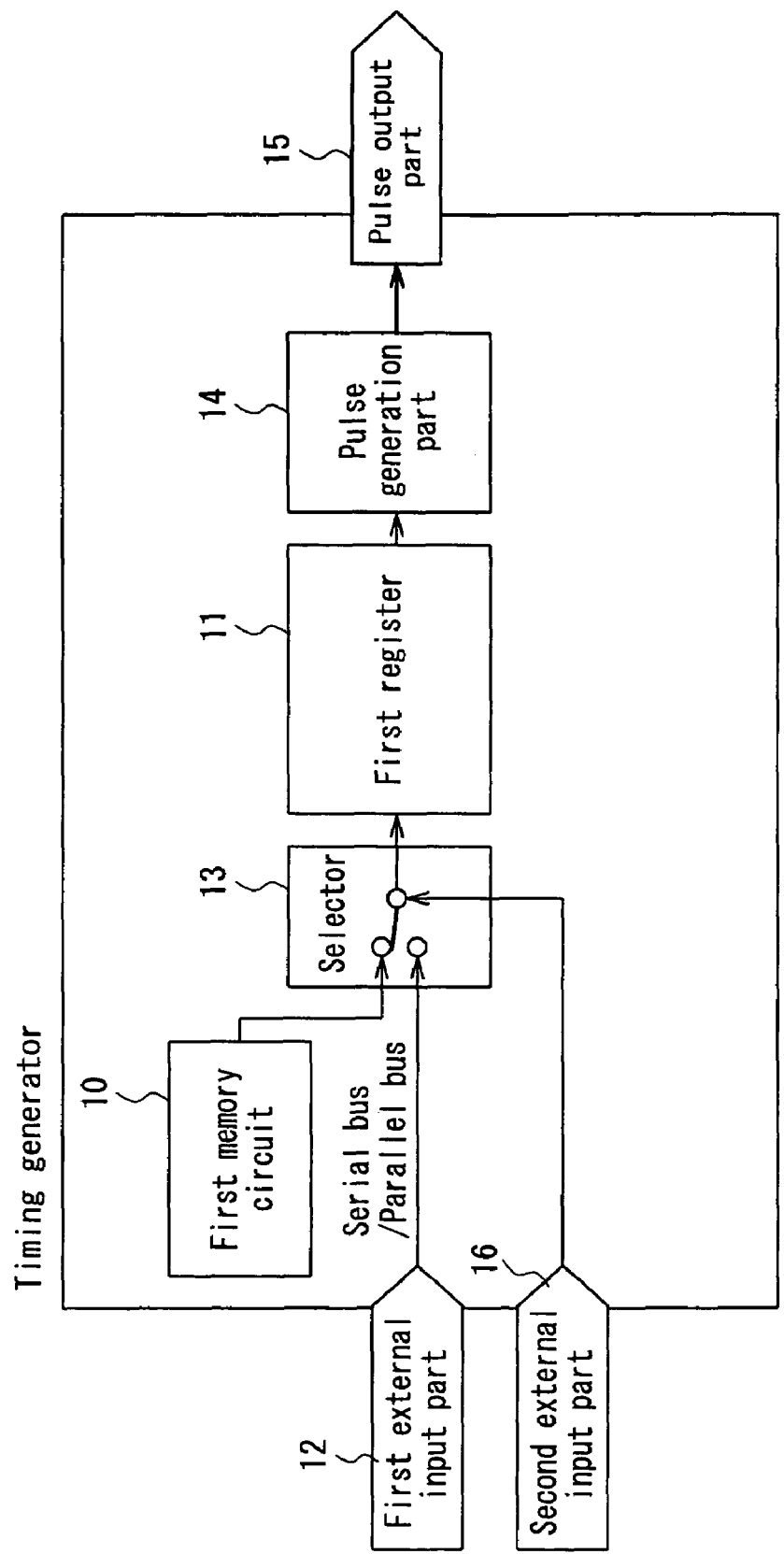
FIG. 14 is a block diagram showing a timing generator of Embodiment 2.

FIG. 14 shows a configuration of a timing generator of Embodiment 2. A first memory circuit 10, a first register 11, a first external input part 12, a selector 13, a pulse generation part 14 and a pulse output part 15 are the same as those in the configuration of the timing generator of Embodiment 1 shown in FIG. 7. In the present embodiment, a second external input part 16 is provided for controlling the selector 13. In accordance with a logic of the second external input part 16, data to be written in the first register 11 is selected from the first memory circuit 10 or the first input part 12.

According to the present embodiment, pulse timings in accordance with timing generation information of the first memory circuit 10 can be generated easily, and the timing generation information can be rewritten easily by inputting data from the first external input part 12 in accordance with the logic of the data input from the second external input part 16. Therefore, even after being assembled as an LSI, a change to the specification of the pulse timings can be made easily.

Embodiment 3

Figure 15:
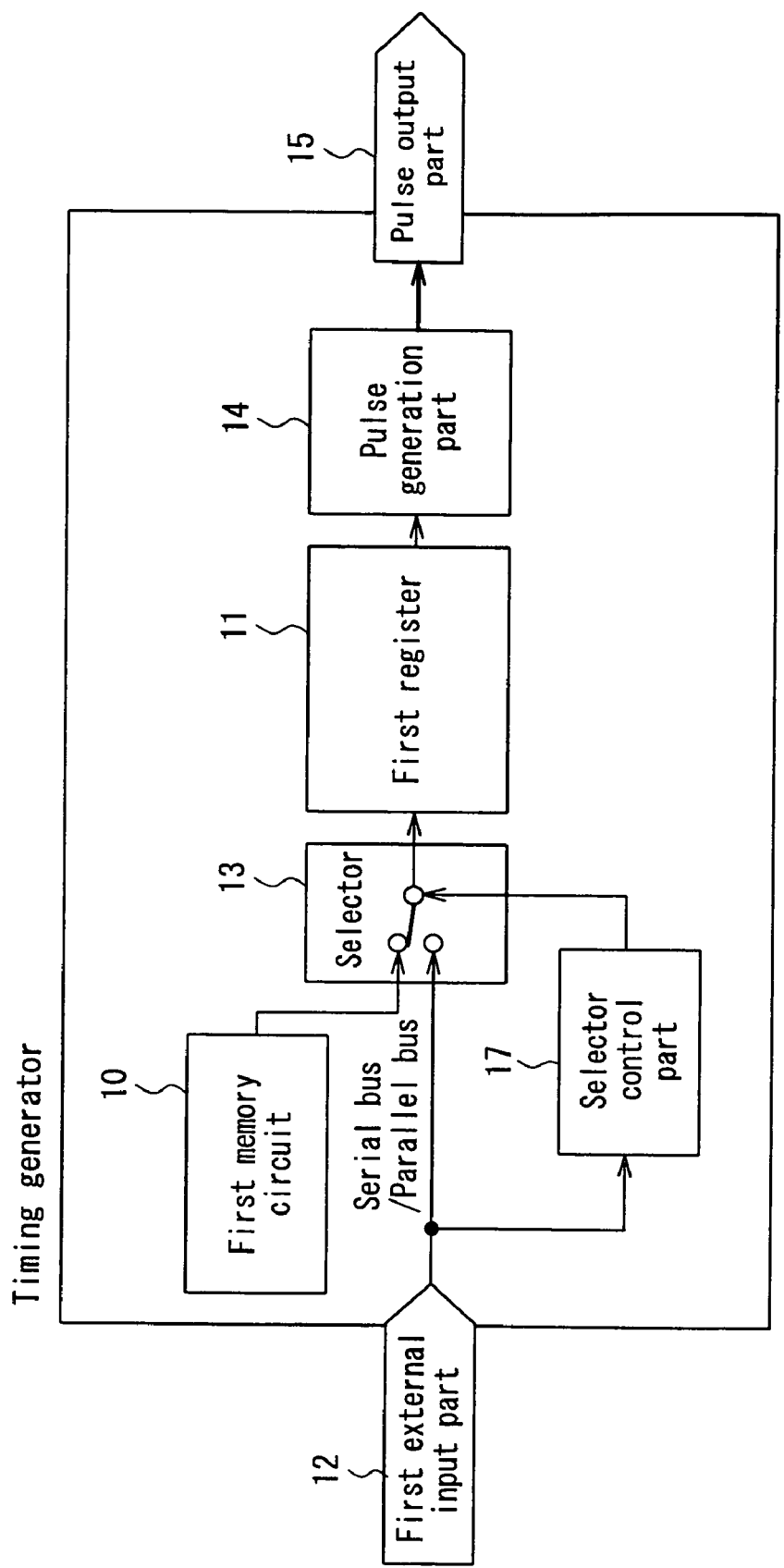
FIG. 15 is a block diagram showing a timing generator of Embodiment 3.

FIG. 15 shows a configuration of a timing generator of Embodiment 3. A first memory circuit 10, a first register 11, a first external input part 12, a selector 13, a pulse generation part 14 and a pulse output part 15 are the same as those in the configuration of the timing generator of Embodiment 1 shown in FIG. 7. In the present embodiment, a selector control part 17 is provided for controlling the selector 13. In accordance with data of the first external input part 12 that is input to the selector control part 17, data to be written in the first register 11 is selected from the first memory circuit 10 or the first input part 12. Although the data to be written in the first register 11 is timing generation information, the data may be divided into MSB and the remaining data, for example, and the MSB can be the control logic for the selector 13 and the remaining data can be the timing generation information.

According to the present embodiment, pulse timings in accordance with timing generation information of the first memory circuit 10 can be generated easily, and the timing generation information can be rewritten easily by inputting data from the first external input part 12 in accordance with the data of the first external input part 12. Therefore, even after being assembled as an LSI, a change to the specification of the pulse timings can be made easily.

Furthermore, as compared with the timing generator according to the above Embodiment 2, the second external input part 16 for controlling the selector 13 becomes unnecessary, which enables a reduction of the number of terminals.

Embodiment 4

Figure 16:
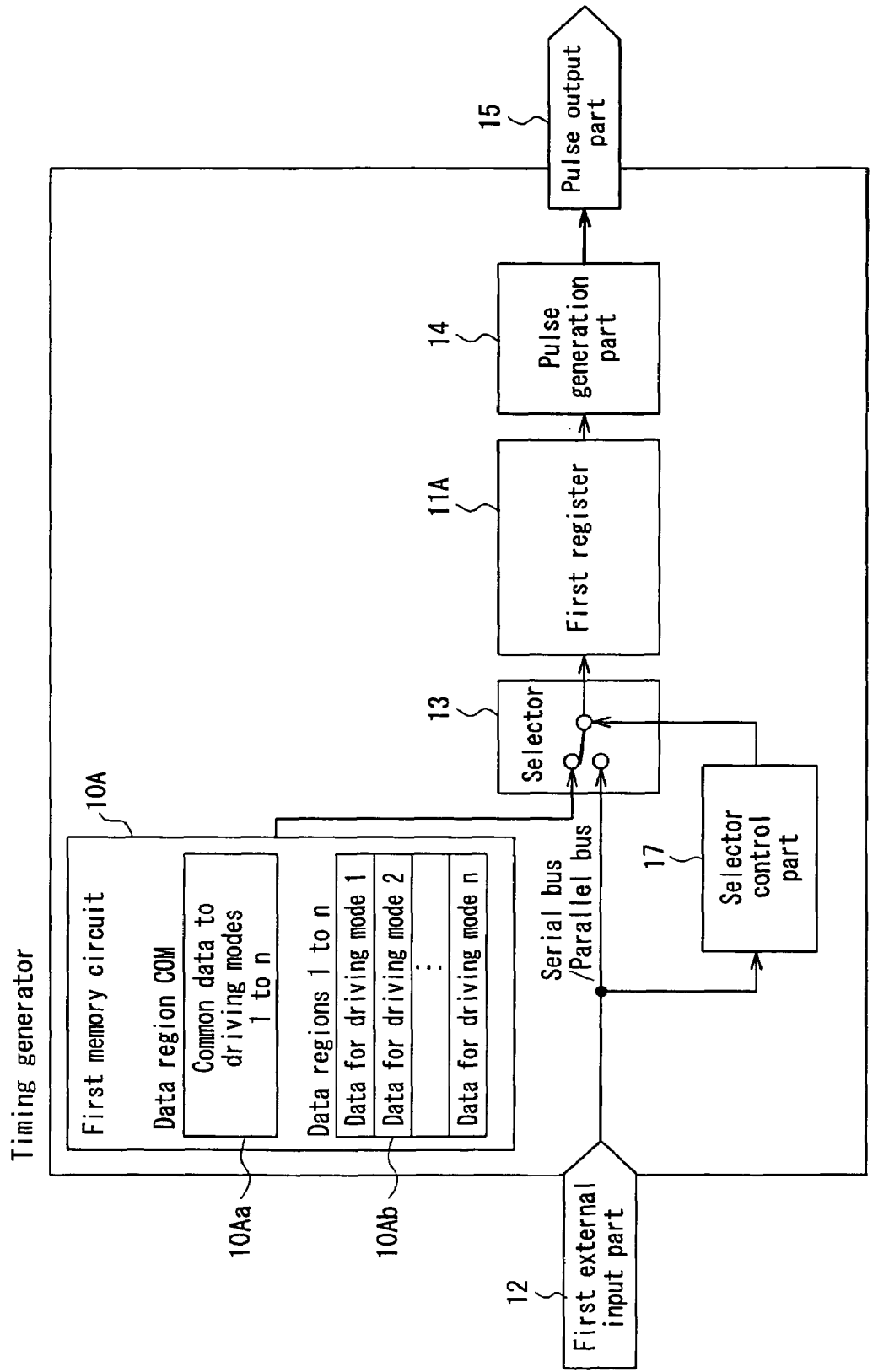
FIG. 16 is a block diagram showing a timing generator of Embodiment 4.

FIG. 16 shows a configuration of a timing generator of Embodiment 4. A first external input part 12, a selector 13, a pulse generation part 14, a pulse output part 15 and a selector control part 17 are the same as those in the configuration of the timing generator of Embodiment 3 shown in FIG. 15.

In the present embodiment, a first memory circuit 10A for storing timing generation information has a data format different from that of the first memory circuit 10 of FIG. 7. Also, a first register 1A for storing the timing generation information has a data format different from that of the first register 11 of FIG. 7.

The first memory circuit 10A stores timing generation information complying with N different driving modes (N represents natural numbers), and is composed of: a data region COM 10Aa in which data COM common to the N different driving modes is stored; and data regions (1 to N) 10Ab in which different data (1 to N) for each of the N different modes are stored. The first register 11A is composed of a register COM for the data COM and a register A for holding any one of the data (1 to N).

When the selector 13 selects the first memory circuit 10A, the timing generation information in the data region COM 10Aa of the first memory circuit 10A is written in the register COM of the first register 11A, and in accordance with a driving mode, any one of the data (1 to N) of the timing generation information in the data regions (1 to N) 10Ab is written in the register A of the first register 11A.

The following describes two cases of the present embodiment in which the pulse timings of V1 to 4 of the normal transfer period in the driving mode 1 of FIG. 5 are generated and in which the pulse timings of V1 to 4 of the normal transfer period in the driving mode 2 of FIG. 6 are generated. FIG. 17 shows timing generation information of the first memory circuit 10A. FIGS. 18 and 19 respectively show timing generation information in the driving mode 1 and the timing generation information in the driving mode 2 in the first register 11A.

In the first memory circuit 10A shown in FIG. 17, a vertical transfer waveform pattern that is the timing generation information common to the two driving modes is stored as data COM in the data region COM 10Aa. The logical changing unit and the number of stages of vertical transfer, which are different in timing generation information between the driving mode 1 and the driving mode 2, and the step number corresponding to one-stage of vertical transfer, though this is the timing generation information common to the driving mode 1 and the driving mode 2, also are stored as data (1 to N) (N=2) in the data regions (1 to N) 10 Ab.

With respect to this timing generation information of the first memory circuit 10A, the timing generation information of the first register 11A in the driving mode 1 is as shown in FIG. 18. The vertical transfer waveform pattern that is the timing generation information common to the driving mode 1 and the driving mode 2 is written in the register region COM. A register A(1) for storing a logical changing unit, a register A(3) for storing the number of stages for vertical transfer and a register A(2) for storing the step number corresponding to one-stage of vertical transfer have registers corresponding to one driving mode of the timing generation information, in each of which the timing generation information in the driving mode 1 of the first memory circuit 10A is written.

FIG. 19 shows the timing generation information of the first register 1A in the driving mode 2. When the driving mode is changed from the driving mode 1 to the driving mode 2, the timing generation information including: the logical changing unit in the register A(1); the number of stages of vertical transfer in the register A(3); and the step number corresponding to one-stage of vertical transfer in the register A(2) is updated. At this time, the timing generation information in the register COM is not updated.

As stated above, according to the present embodiment, the pulse timings in accordance with the timing generation information of the first memory circuit 10A can be generated easily, and the timing generation information can be rewritten through the first external input part 12. Furthermore, since the first register 11A is composed of the register A that holds any one of data (1 to N) with respect to the data regions (1 to N) that are different for each of the N different modes as the timing generation information of the first memory circuit 10A, the registers can be reduced in number, which is advantageous for reducing the chip size and the cost.

Note here that the way to control the selector 13 in the present invention is not limited especially.

Furthermore, in the present embodiment, although the register A constituting the first register 11A holds any one of the data (1 to N), it may hold multiple data.

Embodiment 5

Figure 20:
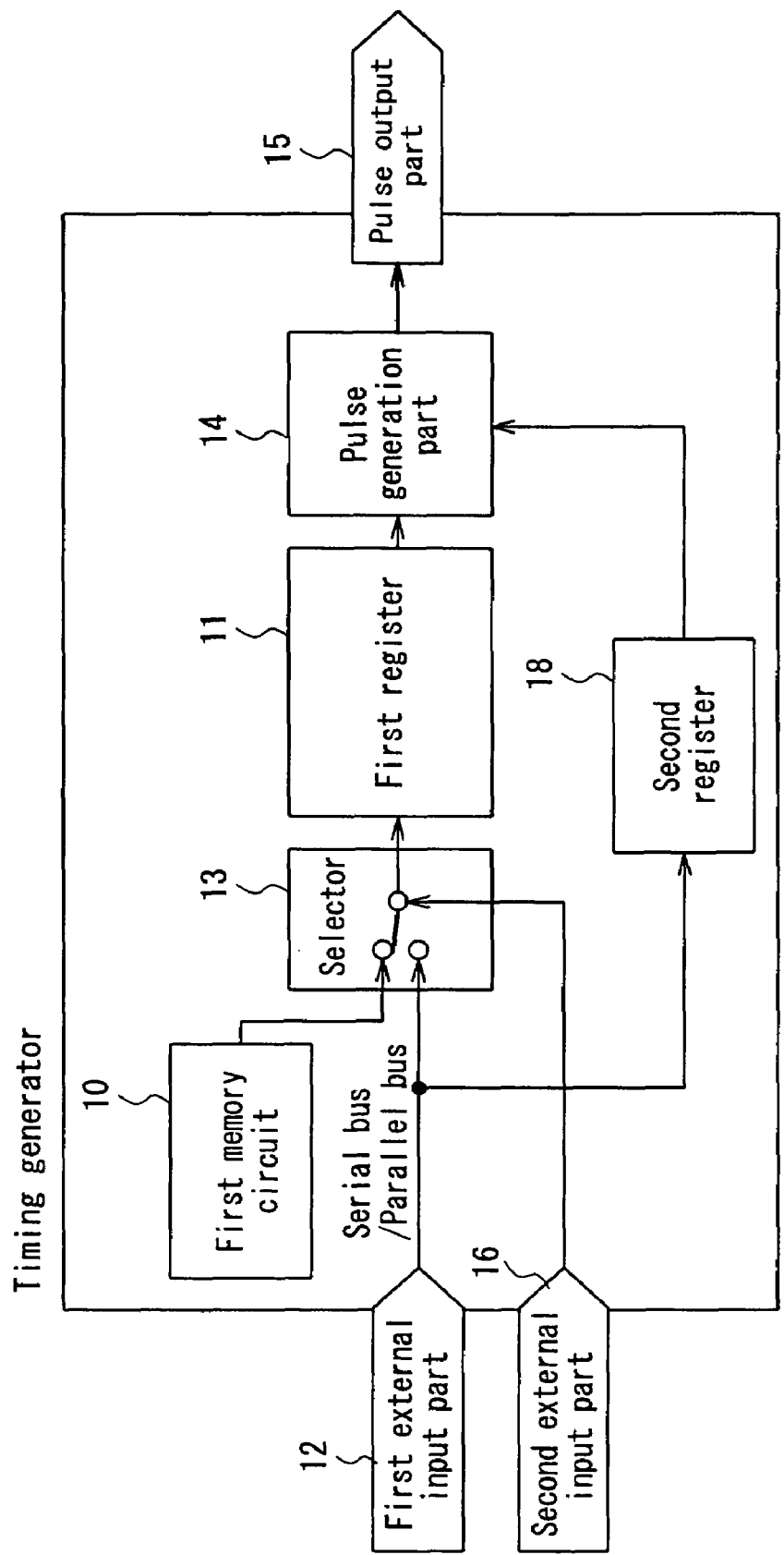
FIG. 20 is a block diagram showing a timing generator of Embodiment 5.

FIG. 20 shows a configuration of a timing generator of Embodiment 5. A first memory circuit 10, a first register 11, a first external input part 12, a selector 13, a pulse generation part 14, a pulse output part 15 and a second external input part 16 are the same as those in the configuration of the timing generator of Embodiment 2 shown in FIG. 14. In the present embodiment, a second register 18 is provided, in which configuration data of functions controlled by a user such as an electronic shutter function of a video camera are stored. On the other hand, the first register 11 mainly stores circuit data as the timing generator. The pulse generation part 14 generates timing pulses in accordance with data supplied from the first register 11 and the second register 18.

The second register 18 is connected with the first external input part 12, through which function configuration information can be written externally. That is, the first external input part 12 is connected with both of the selector 13 and the second register 18. Addresses of the first register 11 and the second register 18 are independent of each other. Therefore, even when the selector 13 selects the first external input part 12, resulting in that data input from the first external input part 12 is input to both of the first register 11 and the second register 18, the data can be written in a desired register between the first register 11 and the second register 18 by designating the address.

As stated above, according to the present embodiment, since the addresses of the first register 11 and the second register 18 are provided independently of each other, the external input part through which data is input can be provided common to the first register 11 and the second register 18, whereby the number of terminals can be reduced. Furthermore, the number of signals of the external control signal for a microcomputer or the like that is connected to the external input part can be reduced as well.

Embodiment 6

Figure 21:
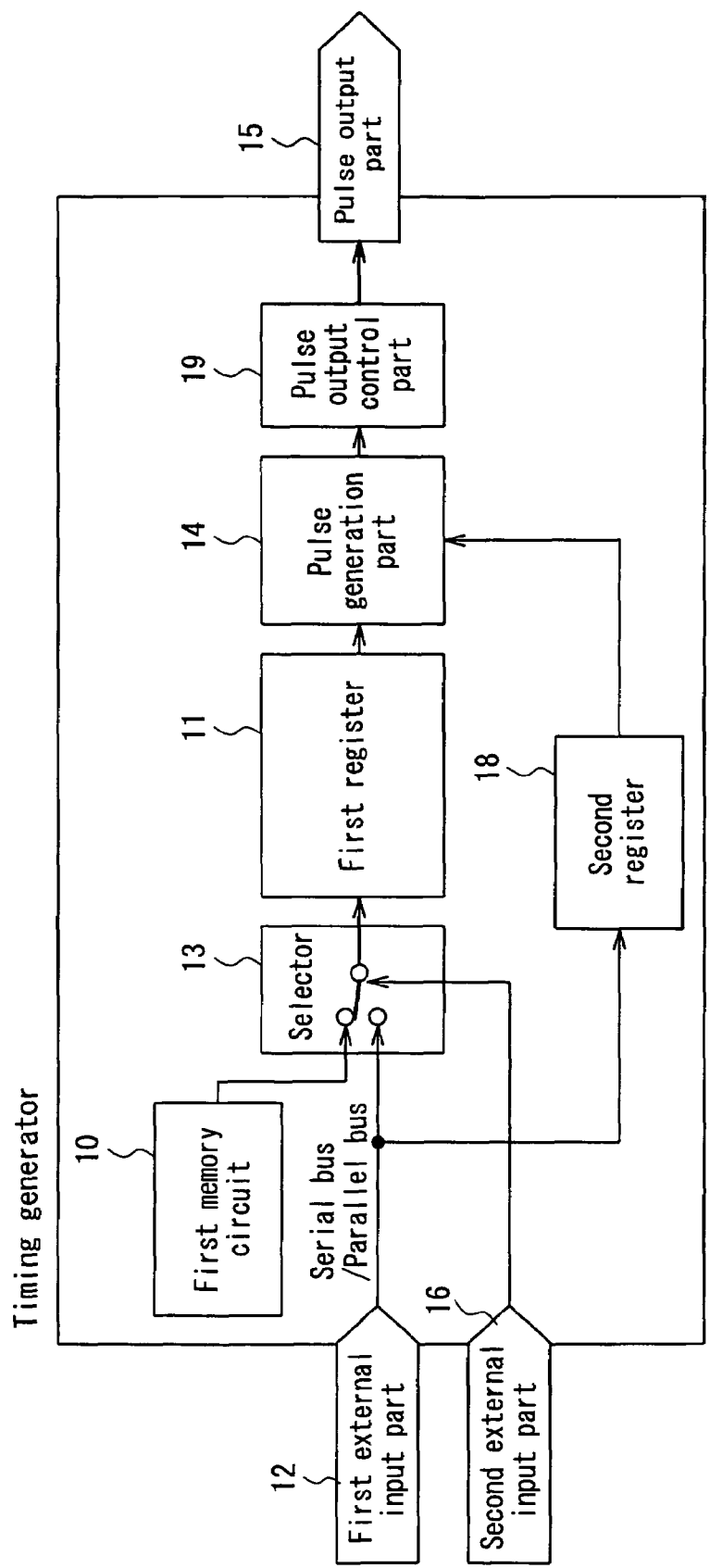
FIG. 21 is a block diagram showing a timing generator of Embodiment 6.

FIG. 21 shows a configuration of a timing generator of Embodiment 6. The device of FIG. 21 has a configuration in which the technical idea of the present embodiment is applied to the timing generator of Embodiment 5 shown in FIG. 20.

A first memory circuit 10, a first register 11, a first external input part 12, a selector 13, a pulse generation part 14, a pulse output part 15, a second external input part 16 and a second register 18 are the same as those in the configuration of the timing generator of Embodiment 5 shown in FIG. 20. In the present embodiment, a pulse output control part 19 is provided. An output pulse from the pulse generation part 14 is input to the pulse output part 15 via the pulse output control part 19.

The pulse output control part 19 is capable of outputting as its output any one of the pulses equivalent to the output logic of the pulse generation part 14, a H level, a L level and a high impedance state. As one embodiment, during the period of writing data in the first register 11, the pulse output control part 19 allows a desired fixed logic among the H, L and the high impedance states to be output to the pulse output part 15, and after the completion of the writing of the data in the first register 11, the pulse output control part 19 allows the pulses equivalent to the output logic of the pulse generation part 14 to be output to the pulse output part 15.

According to the present embodiment, although during the time period until the timing generation information is written in the first register 11, the output logic of the pulse generation part 14 is undefined, the pulse output control part 19 keeps the output constant in one of the H level, the L level and the high impedance. With this configuration, while timing generation information is written in the first register 11 to define the output logic of the pulse generation part 14, the input of an undefined pulse, which might cause a malfunction of a digital signal processing part 3 or the like connected with the pulse output part 15, can be suppressed. Thereby, the reliability of a camera system, for example, can be enhanced.

Embodiment 7

Figure 22:
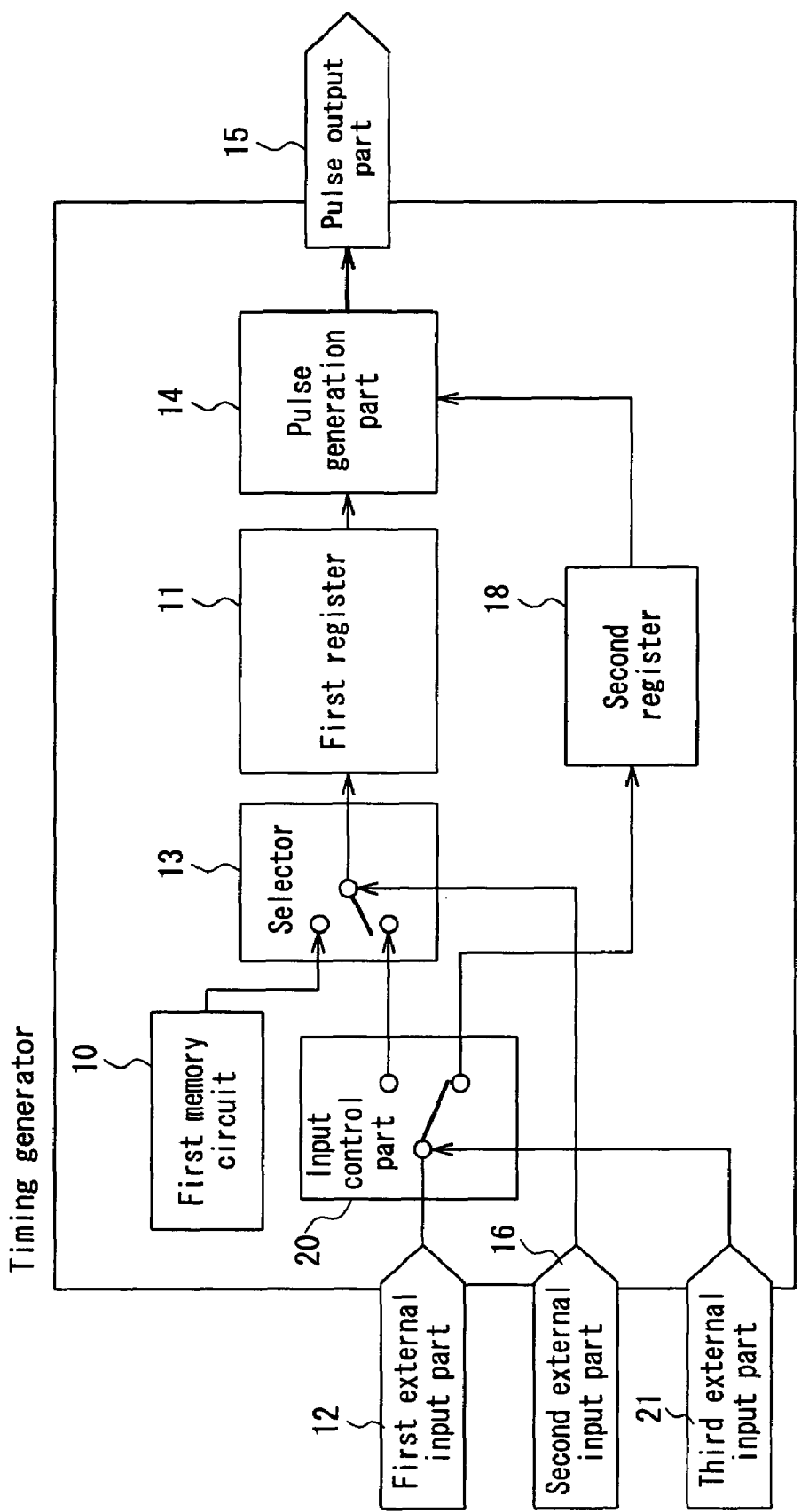
FIG. 22 is a block diagram showing a timing generator of Embodiment 7.

FIG. 22 shows a configuration of a timing generator of Embodiment 7. A first memory circuit 10, a first register 11, a first external input part 12, a selector 13, a pulse generation part 14, a pulse output part 15, a second external input part 16 and a second register 18 are the same as those in the configuration of the timing generator of Embodiment 5 shown in FIG. 20. In the present embodiment, an input control part 20 and a third external input part 21 through which data for controlling the input control part 20 is input are provided.

The input control part 20 switches data input from the first external input part 12 in accordance with the data of the third external input part 21 so as to output the same to one of the selector 13 and the second register 18. The data input from the first external input part 12 contains timing generation information to be written in the first register 11 and configuration information of functions controlled by a user such as an electronic shutter function, which is to be written in the second register 18.

When the timing generation information is written in the first register 11, the input control part 20 allows the data input from the first external input part 12 to be output to the selector 13 in accordance with the H or L level data input from the third external input part 21. Then, the selector 13 allows the data input from the first external input part 12 via the input control part 20 to be output as the timing generation information to the first register 11 in accordance with the H or L level data input from the second external input part 16. Next, when the function configuration information is to be written in the second register 18, the input control part 20 allows the data input from the first external input part 12 to be output as the function configuration information to the second register 18 in accordance with the H or L level data input from the third external input part 21.

According to the present embodiment, by controlling the input control part 20 and the third external input part 21, the external input part for inputting data to the first register 11 and the second register 18 can be made common to them, thus enabling the reduction in the number of terminals through which the timing generation information and the function configuration information are input. Furthermore, the number of signals of the external control signal for a microcomputer or the like that is connected to the external input part can be reduced as well.

By the way, the timing generator of Embodiment 5 has the same object as that of the present embodiment. According to Embodiment 5, however, the designation with addresses permits the control of the writing of the data input from the first external input part 12 in the first register 11 and the second register 18. On the other hand, according to the present embodiment, the writing in the first register 11 and the second register 18 is controlled by the input control part 20 and the third external input part 21, instead of the addresses.

As compared with the timing generator of Embodiment 5, the present embodiment further requires the third external input part 21. In the case of the timing generator of Embodiment 5, however, a malfunction may occur in the case where an address fails to be input correctly during the data input from the first external input part 12 due to an influence of a noise or the like. Particularly, when the function configuration information is to be written in the second register 18, if this information is written in the first register 11 in which the timing generation information is to be stored, there is a high probability that the normal operation cannot be restored unless the power of the camera is turned OFF.

In the present embodiment, by controlling the input control part 20 and the third external input part 21, an error in writing between the first register 11 and the second register 18 can be minimized. Therefore, the reliability of the data input of the timing generation information and the function configuration information can be enhanced as compared with Embodiment 5.

Furthermore, since the data input part for the timing generation information and the function configuration information is made common to them, the number of terminals can be reduced.

Moreover, in the timing generator of Embodiment 5, the first register 11 and the second register 18 are discriminated from each other based on addresses. Therefore, it requires a long bit length, thus increasing memory capacity and communication time. According to the present embodiment, the first register 11 and the second register 18 can be configured without increasing the memory capacity and the communication time.

Embodiment 8

Figure 23:
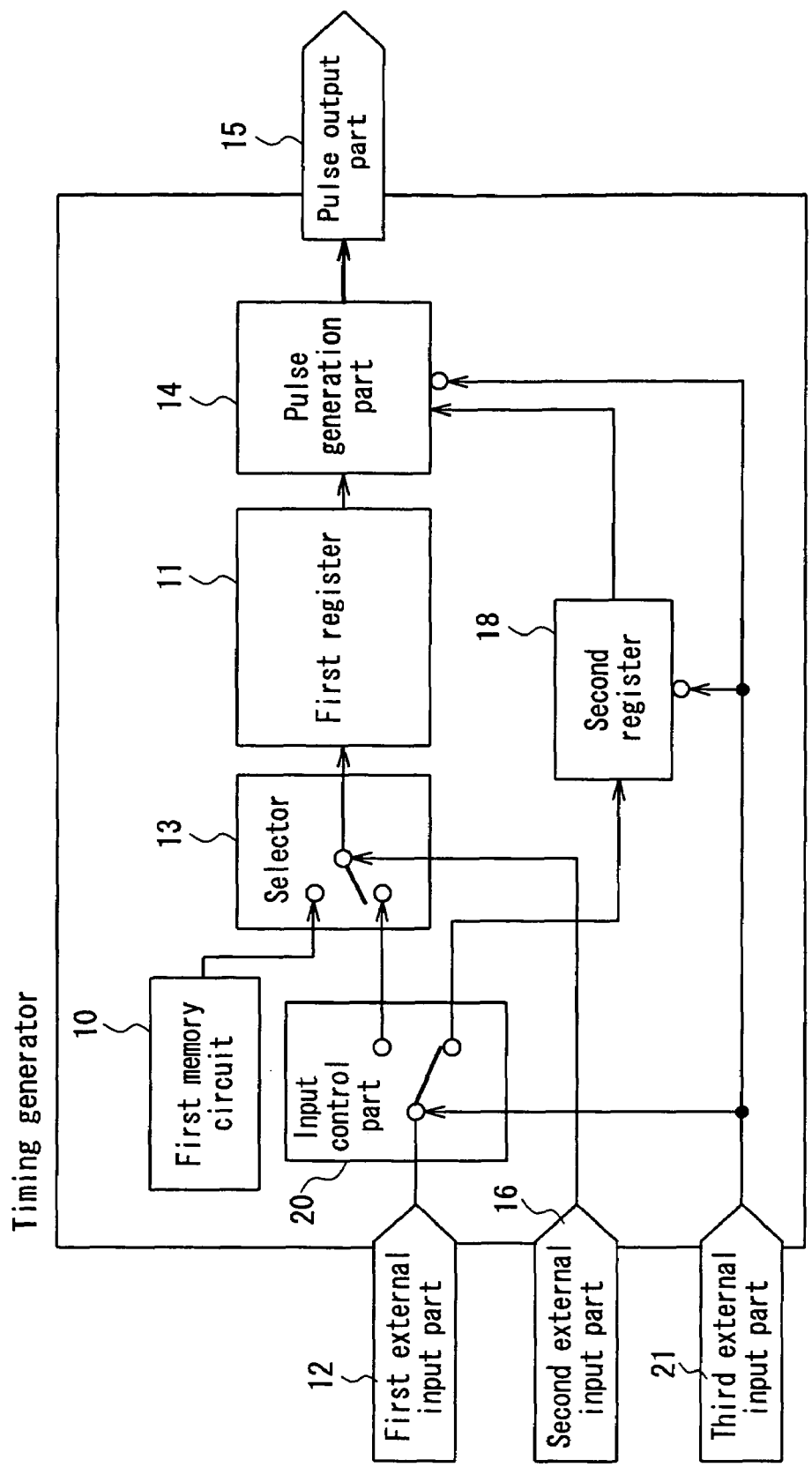
FIG. 23 is a block diagram showing a timing generator of Embodiment 8.

FIG. 23 shows a configuration of a timing generator of Embodiment 8. A first memory circuit 10, a first register 11, a first external input part 12, a selector 13, a pulse generation part 14, a pulse output part 15, a second external input part 16, a second register 18, an input control part 20 and a third external input part 21 are the same as those in the configuration of the timing generator of Embodiment 7 shown in FIG. 22. In the present embodiment, H (or L) level of data of the third external input part 21 is supplied not only to the input control part 20 as shown in FIG. 7 but also to the pulse generation part 14 and the second register 18.

When L (or H) level of data is input to the third external input part 21, the input control part 20 allows the data input from the first external input part 12 to be output to the selector 13 in accordance with the L (or H) level. Then, the selector 13 allows the data input from the first external input part 12 via the input control part 20 to be output as the timing generation information to the first register 11 in accordance with the H (or L) level data input from the second external input part 16.

During a time period when the L (or H) level of data is input to the third external input part 21, the pulse generation part 14 and the second register 18 are initialized.

When H (or L) level of data is input to the third external input part 21, the input control part 20 allows the data input from the first external input part 12 to be output as the function configuration data to the second register 18.

During a time period when the H (or L) level of data is input to the third external input part 21, the pulse generation part 14 is in an operating state of generating a pulse in accordance with the timing generation information stored in the first register 11, and the second register 18 becomes a writable state.

According to the present embodiment, similarly to Embodiment 7, the first register 11 and the second register 18 can be configured without increasing memory capacity and communication time. Furthermore, the pulse generation part 14 is initialized during the time period when the data is input as the timing generation information in the first register 11. Therefore, similarly to Embodiment 6, while timing generation information is written in the first register 11 to define the output logic of the pulse generation part 14, the input of an undefined pulse, which might cause a malfunction of a digital signal processing part 3 or the like connected with the pulse output part 15, can be suppressed.

Furthermore, the data input in the third external input part 21 can be used as a reset signal for the timing generator. This means that the third external input part 21 can double as the reset signal input part.

Note here that each of the above-described embodiments also can have a configuration so as to allow the initialization of the elements except for the first memory circuit 10 and the first register 11 during the time period of the writing in the first register 11 from the first memory circuit 10 or the first register 11, from which the same effects as in the present embodiment can be obtained.

Embodiment 9

Figure 24:
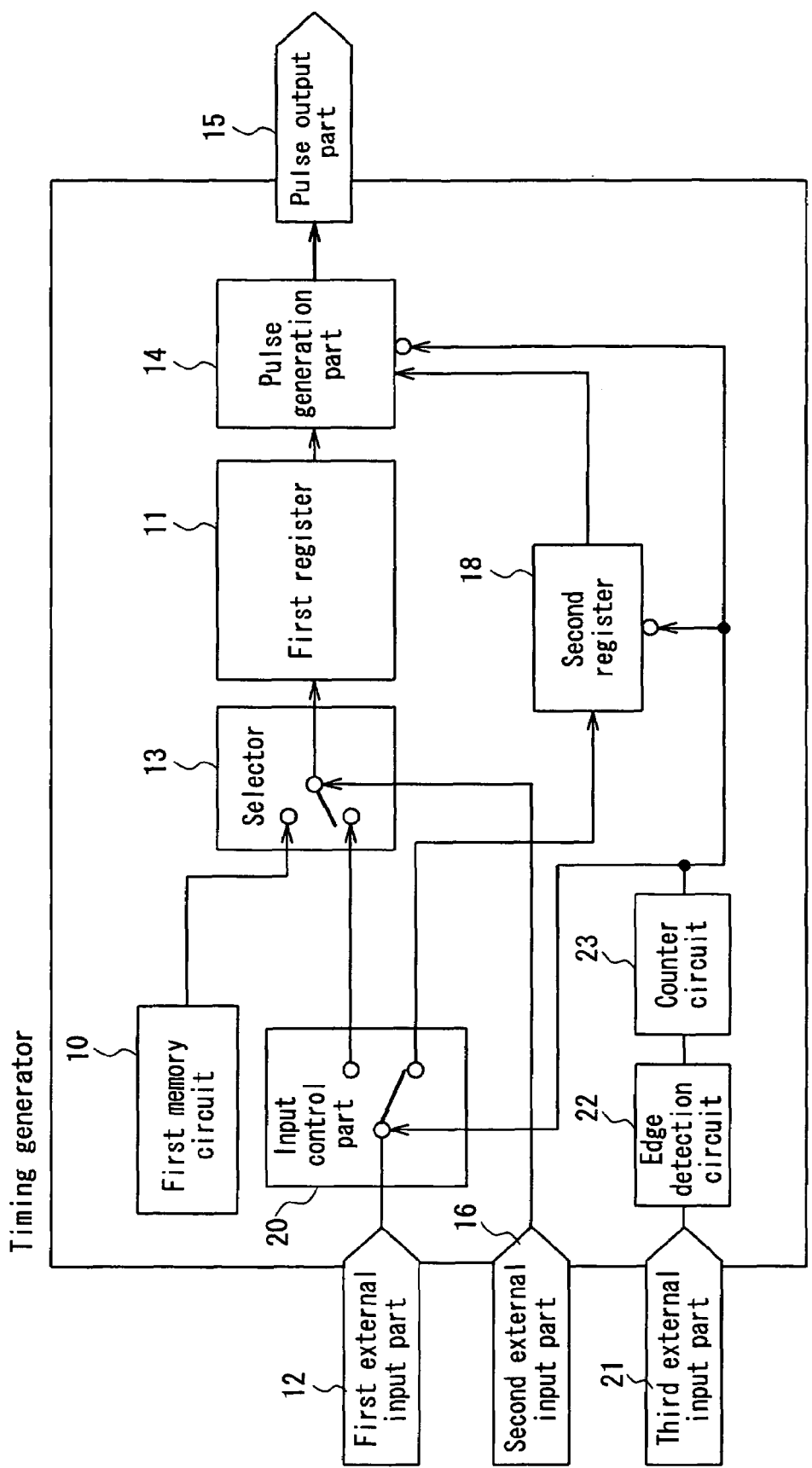
FIG. 24 is a block diagram showing a timing generator of Embodiment 9.

FIG. 24 shows a configuration of a timing generator of Embodiment 9. A first memory circuit 10, a first register 11, a first external input part 12, a selector 13, a pulse generation part 14, a pulse output part 15, a second external input part 16, a second register 18, an input control part 20 and a third external input part 21 are the same as those in the configuration of the timing generator of Embodiment 8 shown in FIG. 23.

In the present embodiment, an edge detection circuit 22 and a counter circuit 23 further are provided, where the edge detection circuit 22 detects an edge of a pulse input to the third external input part 21 and the counter circuit 23 conducts counting with an output of the edge detection circuit 22 as a trigger. The output of the counter circuit 23 is configured so as to function equivalently to the third external input part 21 of Embodiment 8.

That is to say, an edge of a pulse input to the third external input part 21 is detected by the edge detection circuit 22, and at the time of the outputting of the edge detection circuit 22 regarded as a trigger, the counter circuit 23 changes to a L (or H) level and holds the same for a time period at least until the data has been input to the first register 11. Thereby, the pulse generation part 14 and the second register 18 are initialized.

Note here that if there is no problem posed as a system, an initialized block can be selected arbitrarily. In addition, the counting time period of the counter circuit 23 can be set at an arbitrary counting time period that is longer than the time period of the writing in the first register 11.

Next, after the data has been input to the first register 11, the counter circuit 23 changes to a H (or L) level and becomes an operating state for generating a pulse in accordance with the timing generation information stored in the first register 11. The second register 18 becomes a writable state.

As stated above, according to the present embodiment, similarly to Embodiment 8, the pulse generation part 14 is initialized during the time period when the data is input as the timing generation information in the first register 11. Therefore, while timing generation information is written in the first register 11 to define the output logic of the pulse generation part 14, the input of an undefined pulse, which might cause a malfunction of a digital signal processing part or the like connected with the pulse output part 15, can be suppressed.

Note here that the time period for initializing the pulse generation part 14 and the second register 18 is not limited to the time period until the data has been input to the first register 11 as long as it is a sufficient time period for suppressing the input of an undefined pulse, which might cause a malfunction of a digital signal processing part or the like connected with the pulse output part 15. For instance, the initialization may be cancelled at a predetermined time period before the data has been input.

Furthermore, according to the configuration of the present embodiment, without controlling the time period when L (or H) level of data is input in the third external input part 21, the timing generator automatically can judge the completion of the data input to the first register 11 by detecting the edge of the pulse. Thereby, the pulse can be generated in accordance with the timing generation information, which is free from the output of undefined pulses, thus enabling the reduction of a load on a control side.

Embodiment 10

Figure 25:
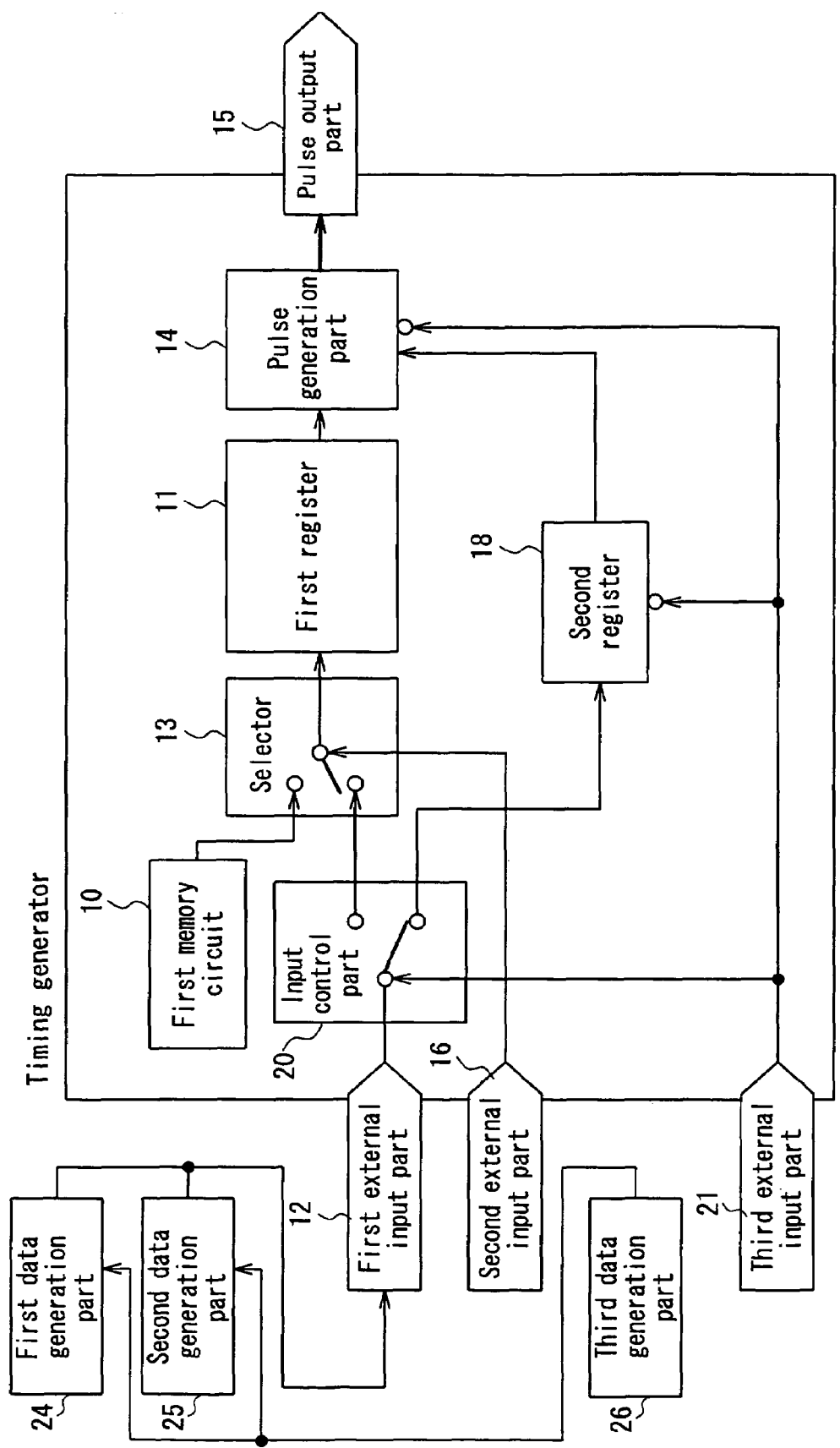
FIG. 25 is a block diagram showing a timing generator of Embodiment 10.

FIG. 25 shows a configuration of a timing generator of Embodiment 10. In the present embodiment, a first memory circuit 10, a first register 11, a first external input part 12, a selector 13, a pulse generation part 14, a pulse output part 15, a second external input part 16, a second register 18, an input control part 20 and a third external input part 21 are the same as those in the configuration of the timing generator of Embodiment 8 shown in FIG. 23.

The present embodiment has a feature concerning the way to use the timing generator. That is to say, data is supplied from a first data generation part 24, a second data generation part 25 and a third data generation part 26, which are disposed outside the timing generator. The first data generation part 24 generates timing generation data to be written in the first register 11, the second data generation part 25 generates function configuration data to be written in the second register 18 and the third data generation part 26 controls the output state of the first data generation part 24 and the second data generation part 25.

In accordance with the data input from the third data generation part 26, the first data generation part 24 outputs data to be input to the first register 11 or becomes a high impedance state. In accordance with the data input from the third data generation part 26, the second data generation part 25 outputs data to be input to the second register 18 or becomes a high impedance state.

The output of the first data generation part 24 and the output of the second data generation part 25 are supplied to the first external input part 12. When the 4first data generation part 24 outputs the data to be input to the first register 11, the second data generation part 25 becomes a high impedance state. When the second data generation part 25 outputs the data to be input to the second register 18, the first data generation part 24 becomes a high impedance state.

As stated above, according to the present embodiment, although the first data generation part 24 for generating data for the first register 11 and the second data generation part 25 for generating the data for the second register 18 are provided separately, the data input part for rewriting the data of the first register 11 and the second register 18 externally can be made common as the first external input part 12.

Note here that in the case where a register further is provided in addition to the first register 11 and the second register 18, and three or more data generation parts are provided, the data input part for them can be made common as the first external input part 12.

Embodiment 11

Figure 26:
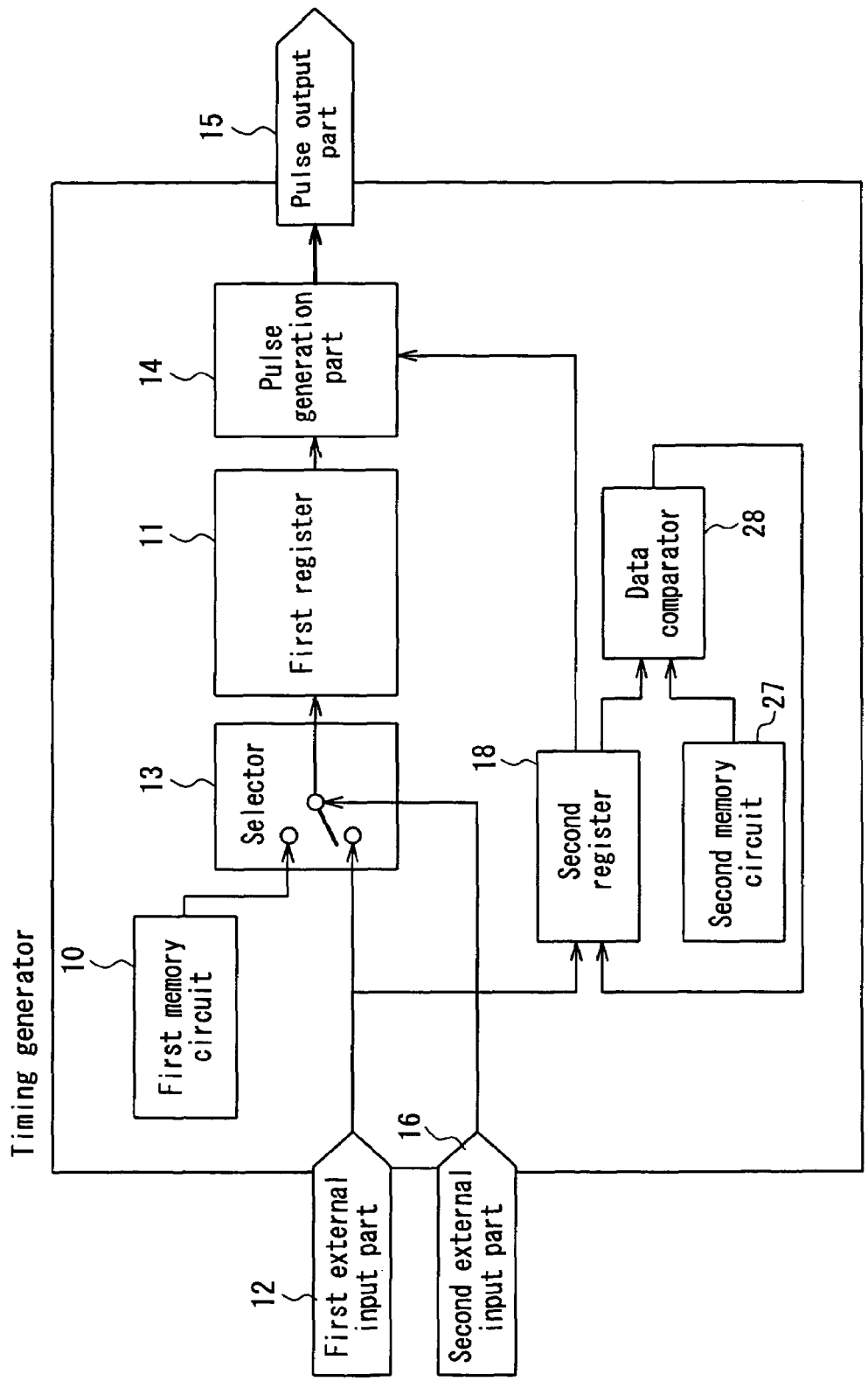
FIG. 26 is a block diagram showing a timing generator of Embodiment 11.

FIG. 26 shows a configuration of a timing generator of Embodiment 11. A first memory circuit 10, a first register 11, a first external input part 12, a selector 13, a pulse generation part 14, a pulse output part 15, a second external input part 16 and a second register 18 are the same as those in the configuration of the timing generator of Embodiment 5 shown in FIG. 20.

In the present embodiment, a second memory circuit 27 and a data comparator 28 that compares data of the second register 18 with that of the second memory circuit 27 further are provided. The second register 18 possibly may include the function configurations such as a test mode or the other configurations that may lead to an undefined operation for the circuit configuration. In order to prevent this from being supplied to the pulse generation part 14, the second memory circuit 27 stores logic information that should not be configured as the function configurations in the second register 18, and the data comparator 28 compares the data with that in the second register 18.

If the logic information that should not be configured in the second register 18 mistakenly is written in the second register 18, as a result of the data comparison with the second memory circuit 27, the data comparator 28 outputs a signal of agreement, which is input to the second register 18 so as to reverse the logic that applies. This prevents inappropriate data from being configured as data of the addresses of the second register 18.

Note here that although, in the above-stated configuration, an example where the logic information that should not be configured as the function configurations in the second register 18 is stored in the second memory circuit 27, this may be stored in the first memory circuit 10. Furthermore, the information stored in the second memory circuit 27 may be rewritten externally.

Note here that, in each of the above-stated embodiments, a timing pulse output from the pulse generation part 14 is not limited to one sequence and may be output as multiple sequences. The same applies to the input/output of signals in the timing generator.

Furthermore, in each of the above-stated embodiments, the description concerns the device having an independent configuration as a timing generator. However, the devices can be configured so as to have functions equivalent to a solid-state imaging device and a camera system.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A timing generator comprising:
  a first memory circuit that stores timing generation information;
  a first register for holding the timing generation information in the first memory circuit;
  a second register that holds control function information as the timing generator;
  a first external input part for accessing the first register so as to rewrite data therein;
  a selector that selects one of the first memory circuit and the first external input part in order to conduct writing of data in the first register; and
  a second external input part that supplies the selector with a selection signal;
  a pulse generation part that generates a pulse timing in accordance with the timing generation information held in the first register and the control function information held in the second register so as to output a single or a plurality of pulses;
  an input control part that selects either the first register or the second register in which data input from the first external input part is to be written,
  wherein the selector selects data to be input in the first register from an output of the first memory circuit and an input out of the input control part in accordance with the selection signal supplied from the second external input part, and
  during a time period when the data input from the first external input part is written into the first register, the pulse generation part is initialized; and
  wherein during a time period when data is written in the first register, an output of the pulse generation part is fixed at any one of a high, a low and a high impedance state and after completion of the writing of the data in the first register, a pulse is output in accordance with the timing generation information held in the first register.

2. The timing generator according to claim 1,
wherein the first memory circuit stores pulse generation information complying with N different modes (N denotes a natural number), the pulse generation information containing: data (COM) common to the respective modes; and data (D1 to DN) different for each mode,
the first register holds the data region (COM) and at least one of the data (D1 to DN),
wherein if the selector selects the first memory circuit, data corresponding to a configured mode among the data D1 to DN is written in the first register, and if the selector selects the first external input part, data corresponding to a configured mode is written from the first external input part to the first register.

3. The timing generator according to claim 1,
wherein the first external input part enables accessing to the first register and the second register independently so as to rewrite internal data therein.

4. The timing generator according to claim 3, further comprising:
a second memory circuit; and
a data comparator that compares the control function information held by the second register with data in the second memory circuit,
wherein the control function information held in the second register is changeable in accordance with a result of the comparison by the data comparator.

5. The timing generator according to claim 4, wherein data in the second register is rewritten in an arbitrary logic of at L or a H level in accordance with an output of the data comparator.

6. The timing generator according to claim 1,
wherein during a time period when writing is conducted from the first memory circuit or the first external input part to the first register, the timing generator is initialized except for the first memory circuit and the first register.

7. The timing generator according to claim 1, further comprising a counter circuit that reverses an output from an initial state in response to an edge of a pulse input from the third external input part as a trigger, and holds the same, wherein the reversed state returns to the initial state after counting a predetermined time period,
wherein the input control part outputs the data input from the first external input part to either the selector or the second register in accordance with the output of the counter circuit.

8. A solid-state imaging device provided with the timing generator according to claim 1.

9. A camera system provided with the timing generator according to claim 1.

* * * * *